US008700260B2

(12) United States Patent
Jolly et al.

(10) Patent No.: US 8,700,260 B2
(45) Date of Patent: Apr. 15, 2014

(54) LAND VEHICLES AND SYSTEMS WITH CONTROLLABLE SUSPENSION SYSTEMS

(75) Inventors: Mark R. Jolly, Raleigh, NC (US); Lane R. Miller, Fuquay-Varina, NC (US); Mark A Norris, Apex, NC (US)

(73) Assignee: LORD Corporation, Cary, NC (US)

( * ) Notice: Subject to any disclaimer, the term of this patent is extended or adjusted under 35 U.S.C. 154(b) by 20 days.

(21) Appl. No.: 13/262,384

(22) PCT Filed: Mar. 30, 2010

(86) PCT No.: PCT/US2010/029160
§ 371 (c)(1),
(2), (4) Date: Sep. 30, 2011

(87) PCT Pub. No.: WO2010/117762
PCT Pub. Date: Oct. 14, 2010

(65) Prior Publication Data
US 2012/0035808 A1 Feb. 9, 2012

Related U.S. Application Data

(60) Provisional application No. 61/211,416, filed on Mar. 30, 2009.

(51) Int. Cl.
*B60G 23/00* (2006.01)
*B62K 25/00* (2006.01)

(52) U.S. Cl.
USPC .......................................................... 701/37

(58) Field of Classification Search
USPC ............... 701/37–40; 340/440, 438; 73/11.04
See application file for complete search history.

(56) References Cited

U.S. PATENT DOCUMENTS

| 4,398,172 A | 8/1983 | Carroll et al. |
| 4,625,993 A | 12/1986 | Williams |

(Continued)

FOREIGN PATENT DOCUMENTS

| DE | 3930555 A1 | 1/1991 |
| DE | 10348916 A1 | 6/2005 |

(Continued)

OTHER PUBLICATIONS

Lord Corporation, Lord MR Suspension System for Military Tactical and Combat Vehicles, 1 page, 2010.

(Continued)

*Primary Examiner* — Yonel Beaulieu
(74) *Attorney, Agent, or Firm* — Richard G. Miller

(57) ABSTRACT

The land vehicle includes a body, a power plant and a plurality of land engagers, the land engagers for engaging land and propelling the land vehicle across land. The land vehicle includes a controllable suspension system, the controllable suspension system for controlling suspension movements between the body and the land engagers. The land vehicle includes a computer system and suspension sensors located proximate the land engagers for measuring suspension parameters representative of suspension movements between the body and the land engagers and outputting a plurality of suspension sensor measurement outputs. The land vehicle includes controllable force suspension members located proximate the land engagers and the suspension sensors, the controllable force suspension members applying suspension travel forces between the body and the land engagers to control the suspension movements. The land vehicle computer system includes a controllable suspension system algorithm for controlling the controllable force suspension members to control vehicle body motion and the suspension movements between the body and the land engagers, and a health usage monitoring algorithm for monitoring sensors and assessing a health and a usage of the vehicle and its suspension components.

18 Claims, 23 Drawing Sheets

(56) References Cited

U.S. PATENT DOCUMENTS

| | | | |
|---|---|---|---|
| 4,728,922 | A | 3/1988 | Christen et al. |
| 5,032,821 | A | 7/1991 | Domanico |
| 5,400,018 | A | 3/1995 | Scholl et al. |
| 5,452,919 | A | 9/1995 | Hoyle |
| 5,619,413 | A | 4/1997 | Oakley |
| 5,627,751 | A | 5/1997 | Davis et al. |
| 5,780,782 | A | 7/1998 | O'Dea |
| 5,780,783 | A | 7/1998 | Heider et al. |
| 5,825,284 | A | 10/1998 | Dunwoody |
| 5,884,238 | A | 3/1999 | Noll et al. |
| 6,192,305 | B1 * | 2/2001 | Schiffmann ............... 701/45 |
| 6,202,020 | B1 * | 3/2001 | Kyrtsos .................... 701/80 |
| 6,336,065 | B1 | 1/2002 | Gibson et al. |
| 6,343,236 | B1 | 1/2002 | Gibson et al. |
| 6,384,719 | B1 | 5/2002 | Dieckmann |
| 6,424,907 | B1 | 7/2002 | Rieth et al. |
| 6,546,363 | B1 | 4/2003 | Hagenbuch |
| 6,554,293 | B1 | 4/2003 | Fennel |
| 6,681,180 | B2 | 1/2004 | Bevly et al. |
| 6,691,064 | B2 | 2/2004 | Vronman |
| 6,803,530 | B2 | 10/2004 | Carlstrom et al. |
| 6,930,610 | B2 | 8/2005 | Gao et al. |
| 6,941,202 | B2 | 9/2005 | Wilson et al. |
| 7,136,794 | B1 | 11/2006 | Bechhoefer |
| 7,233,236 | B2 | 6/2007 | Lu et al. |
| 7,302,331 | B2 | 11/2007 | Meyers et al. |
| 7,308,385 | B2 | 12/2007 | Wegerich et al. |
| 7,357,062 | B2 | 4/2008 | Joynt |
| 7,496,798 | B2 | 2/2009 | Link et al. |
| 7,654,370 | B2 | 2/2010 | Cubalchini |
| 8,065,054 | B2 | 11/2011 | Tarasinski |
| 2006/0265108 | A1 | 11/2006 | Kieren et al. |

FOREIGN PATENT DOCUMENTS

| | | |
|---|---|---|
| DE | 102004033898 A1 | 1/2006 |
| DE | 102005009701 A1 | 9/2006 |
| DE | 102006052368 A1 | 5/2008 |
| EP | 0477249 B1 | 5/1995 |
| EP | 0625697 B1 | 3/1999 |
| EP | 1120341 A3 | 3/2003 |
| EP | 0887630 B1 | 10/2003 |
| EP | 1749722 A1 | 2/2007 |
| EP | 1604179 B1 | 10/2011 |
| FR | 2834338 A1 | 7/2003 |
| WO | 2007095088 A3 | 8/2007 |

OTHER PUBLICATIONS

E.J. Krasnicki, Lord Corporation, The Experimental Performance of an Off-Road Vehicle Utilizing a Semi-Active Suspension, 9 pages.

Onstar Corp., Press Room, System Details, Automatic Crash Response, OnStar Business Vehicle Manager, 2009.

Consumeraffairs.com, GM Offers OnStar Diagnostic Service by Email, 1 page, Sep. 16, 2005.

ONR, Advanced Planning Briefing to Industry, 31 pages, Apr. 13, 2006.

Wikipedia, Suspension (vehicle), http://en.wikipedia.org/wiki/Suspension_(vehicle), 11 pages, Mar. 20, 2009.

Paul Allen, Cranfield University, Models for the Dynamic Simulation of Tank Track Components, 193 pages, Jan. 2006.

Lincolns Online.Com, Mark VIII Suspension Test—1, 9 pages, May 18, 2000.

* cited by examiner

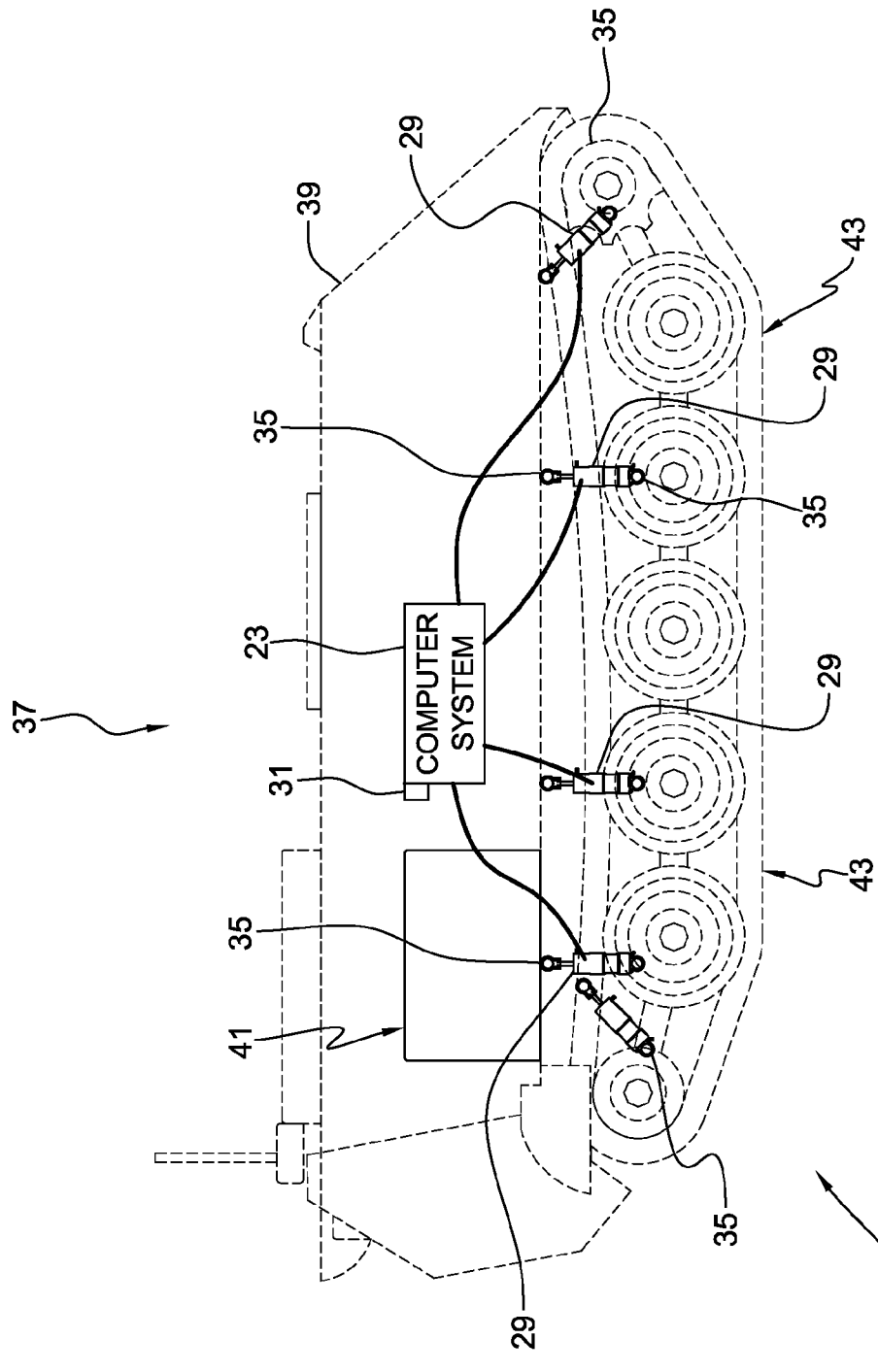

LAND VEHICLES AND SYSTEMS WITH CONTROLLABLE SUSPENSION SYSTEMS

CROSS REFERENCE

This application claims the benefit of, and incorporates by reference, U.S. Provisional Patent Application No. 61/211,416 filed on Mar. 30, 2009.

FIELD OF THE INVENTION

The invention relates to the field of land vehicles. The invention relates to land vehicles with controllable suspension systems. More particularly the invention relates to controllable suspension systems for large military vehicles that are used in a variety of conditions, including on road and off road.

SUMMARY OF THE INVENTION

In an embodiment the invention includes a suspension control system including computer system; a plurality of suspension sensors located proximal to at least some of the suspension locations for measuring suspension parameters; a plurality of controllable force suspension members located proximal to at least some of the suspension locations capable of applying forces across the suspension; a body motion sensor for measuring vehicle body motion; a vehicle databus interfacing with the computer system; wherein the computer system receives the sensors' outputs and implements a suspension control algorithm for controlling the controllable force suspension members; and the computer system monitors the health of the controllable suspension system with monitoring of the sensors and assessing the health of a plurality of vehicle suspension components; and the computer system includes regime recognition instructions for using the sensors and data on the databus for determining a vehicle operating parameter and/or a vehicle operating configuration to recognize a regime, and wherein the suspension control algorithm adjusts to the recognized regime.

In an embodiment the invention includes a suspension control system including computer system; a plurality of suspension sensors located proximal to at least some of the suspension locations for measuring suspension parameters; a plurality of controllable force suspension members located proximal to at least some of the suspension locations capable of applying forces across the suspension; a body motion sensor for measuring vehicle body motion; a vehicle databus interfacing with the computer system; wherein the computer system receives the sensors' outputs and implements a suspension control algorithm for controlling the controllable force suspension members; and the computer system monitors the health of the controllable suspension system with monitoring of the sensors and assessing the health of a plurality of vehicle suspension components; and the computer system includes regime recognition instructions for using the sensors and data on the databus for determining a vehicle operating parameter and/or a vehicle operating configuration to recognize a regime, and wherein the suspension control algorithm adjusts to the recognized regime.

In an embodiment the invention includes a land vehicle, the land vehicle having a body, a power plant and a plurality of land engagers, the land engagers for engaging land and propelling the land vehicle across land. The land vehicle includes a controllable suspension system, the controllable suspension system for controlling a plurality of suspension movements between the body and the land engagers. The land vehicle includes a computer system with computer readable medium. The land vehicle includes a plurality of suspension sensors located proximal to the land engagers for measuring a plurality of suspension parameters representative of suspension movements between the body and the land engagers and outputting a plurality of suspension sensor measurement outputs. The land vehicle includes a plurality of controllable force suspension members located proximal the land engagers and the suspension sensors, the controllable force suspension members for applying a plurality of controllable suspension travel forces between the body and the land engagers to control the suspension movements. The land vehicle includes a body motion sensor, the body motion sensor for outputting a plurality of vehicle body motion measurement outputs. The land vehicle includes a vehicle databus interfacing with the computer system, the vehicle databus communicating a plurality of vehicle data communication signals. The computer system receives the suspension sensor measurement outputs and the vehicle body motion measurement outputs and the computer readable medium including a first program instruction with the computer system executing a controllable suspension system algorithm for controlling the controllable force suspension members to control vehicle body motion and the suspension movements between the body and the land engagers, and the computer readable medium including a second program instruction with the computer system executing a health usage monitoring algorithm for monitoring the outputs and assessing a health and a usage of a vehicle suspension component.

In an embodiment the invention includes a land vehicle system, for a land vehicle having a body, a power plant and a plurality of land engagers, the land engagers for engaging land and propelling the land vehicle across land. The land vehicle system includes a controllable suspension system, the controllable suspension system for controlling a plurality of suspension movements between the body and the land engagers. The land vehicle system includes a computer system with computer readable medium. The land vehicle system includes a plurality of suspension sensors located proximal to the land engagers and suspension locations for measuring a plurality of suspension parameters representative of suspension movements between the body and the land engagers and outputting a plurality of suspension sensor measurement outputs. The land vehicle system includes a plurality of controllable force suspension members located proximal the land engagers and the suspension sensors, the controllable force suspension members for applying a plurality of controllable suspension travel forces between the body and the land engagers to control the suspension movements. The land vehicle system includes a body motion sensor, the body motion sensor for outputting a plurality of vehicle body motion measurement outputs, wherein the computer system receives the suspension sensor measurement outputs and the vehicle body motion measurement outputs and executes a controllable suspension system algorithm for controlling the controllable force suspension members to control vehicle body motion and the suspension movements between the body and the land engagers, and the computer system executes a health usage monitoring algorithm for monitoring these outputs and assessing a health usage of a suspension related component.

In an embodiment the invention includes a monitoring apparatus for diagnosing faults in a land vehicle having a body, a power plant and a plurality of land engagers, the land engagers for engaging land and propelling the land vehicle across land. The apparatus includes a controllable suspension system, the controllable suspension system for controlling a plurality of suspension movements between the body and the land engagers, with a plurality of suspension sensors located proximal to the land engagers for measuring a plurality of suspension parameters representative of suspension movements between the body and the land engagers and outputting a plurality of suspension sensor measurement outputs; a plurality of controllable force suspension members located proximal the land engagers and the suspension sensors, the controllable force suspension members for applying a plurality of controllable suspension travel forces between the body and the land engagers to control the suspension movements; and a body motion sensor, the body motion sensor for outputting a plurality of vehicle body motion measurement outputs. The apparatus receives the suspension sensor measurement outputs and the vehicle body motion measurement outputs and executes controllable suspension system instructions for controlling the controllable force suspension members to control vehicle body motion and the suspension movements between the body and the land engagers, and the apparatus includes reference data store containing failure mode identification data and associated system data sampled from behavior of the controllable suspension system in the failure mode; and a similarity engine responsive to monitored system data indicative of monitored behavior of the controllable suspension system, for generating at least one similarity value for a comparison of the monitored data to the failure mode associated system data, as a diagnostic indication of the failure mode.

In an embodiment the invention includes a method for diagnosing faults in a land vehicle having a body, a power plant and a plurality of land engagers, the land engagers for engaging land and propelling the land vehicle across land. The method includes providing a controllable suspension system, the controllable suspension system disposed between the body and the land engagers to control a plurality of suspension movements between the body and the land engagers, the controllable suspension system including a plurality of suspension sensors located proximal to the land engagers suspension locations for measuring a plurality of suspension parameters representative of suspension movements between the body and the land engagers and outputting a plurality of suspension sensor measurement outputs; a plurality of controllable force suspension members located proximal the land engagers and the suspension sensors, the controllable force suspension members for applying a plurality of controllable suspension travel forces between the body and the land engagers to control the suspension movements; a body motion sensor, the body motion sensor for outputting a plurality of vehicle body motion measurement outputs; with the controllable suspension system receiving the suspension sensor measurement outputs and the vehicle body motion measurement outputs and executing controllable suspension system instructions for controlling the controllable force suspension members to control vehicle body motion and the suspension movements between the body and the land engagers, and the controllable suspension system acquiring monitored controllable suspension system data indicative of monitored controllable suspension behavior of the controllable suspension system; sampling controllable suspension system data from a controllable suspension failure mode to define controllable suspension reference system data associated with the controllable suspension failure mode, and comparing for similarity the monitored system data to the reference system data to generate a similarity value as a diagnostic indication of the controllable suspension failure mode.

In an embodiment the invention includes a monitoring apparatus for diagnosing faults in a land vehicle having a body, a power plant and a plurality of land engagers, the land engagers for engaging land and propelling the land vehicle across land. The apparatus including a controllable suspension system, the controllable suspension system for controlling a plurality of suspension movements between the body and the land engagers, a plurality of suspension sensors located proximal to the land engagers for sensing a plurality of suspension measurables and outputting a plurality of suspension sensor measurement outputs; a plurality of controllable force suspension members located proximal the land engagers and the suspension sensors, the controllable force suspension members for applying a plurality of controllable suspension travel forces between the body and the land engagers to control the suspension movements; a body motion sensor, the body motion sensor for outputting a plurality of vehicle body motion measurement outputs. The apparatus receives the suspension sensor measurement outputs and the vehicle body motion measurement outputs and executes controllable suspension system instructions for controlling the controllable force suspension members to control vehicle body motion and the suspension movements between the body and the land engagers, and the apparatus including computer readable failure mode reference identification data for detecting a failure mode in the controllable suspension system; and the apparatus compares monitored controllable suspension system data to the failure mode reference identification data to a diagnose an impending failure mode of the controllable suspension system.

In an embodiment the invention includes a monitoring method for diagnosing faults in a plurality of land vehicles. The method includes providing a plurality of land vehicles comprised a body, a power plant and a plurality of land engagers, the land engagers for engaging land and propelling the land vehicles across land, the land vehicles including a controllable suspension system, the controllable suspension system for controlling a plurality of suspension movements between the body and the land engagers, the controllable suspension system including a plurality of suspension sensors located proximal to the land engagers suspension locations for sensing a plurality of suspension measurables and outputting a plurality of suspension sensor measurement outputs; the controllable suspension system including a plurality of controllable force suspension members located proximal the land engagers and the suspension sensors, the controllable force suspension members for applying a plurality of controllable suspension travel forces between the body and the land engagers to control the suspension movements; the controllable suspension system including a body motion sensor, the body motion sensor for outputting a plurality of vehicle body motion measurement outputs. The method includes receiving the suspension sensor measurement outputs and the vehicle body motion measurement outputs and executing controllable suspension system instructions for controlling the controllable force suspension members to control vehicle body motion and the suspension movements between the vehicle bodies and the land engagers, and providing computer readable failure mode reference identification data for detecting a failure mode in the controllable suspension systems; and comparing monitored controllable suspension system data to the failure mode reference identification data to a diagnose a failure mode of the controllable suspension systems.

In an embodiment the invention includes a vehicle suspension control system including a vehicle computer system; a plurality of suspension sensors disposed proximate to a plurality of suspension locations of a suspension for measuring suspension parameters of a plurality of suspension components; a body motion sensor for measuring body motion; a databus interfacing with the computer system; wherein the computer system receives the sensors' outputs and implements a suspension algorithm for the suspension members; and the computer system monitors the health of the suspension system with monitoring of the sensors and assessing the health of a plurality of suspension components; and the computer system includes regime recognition instructions for using the sensors and data on the databus for determining an operating parameter and an operating configuration to recognize a regime, and wherein the suspension control algorithm adjusts to the recognized regime.

In an embodiment the invention includes a monitoring method for diagnosing faults in a plurality of vehicles. The method includes providing a plurality of vehicles comprised of a body, a power plant and a plurality of engagers, the engagers for propelling the vehicles, the vehicles including a motion control suspension system, the suspension system for controlling a plurality of movements between the body and the engagers, the suspension system including a plurality of suspension sensors located proximal to the engagers for sensing a plurality of suspension measurables and outputting a plurality of suspension sensor measurement outputs; the controllable suspension system including a body motion sensor, the body motion sensor for outputting a plurality of vehicle body motion measurement outputs; receiving the suspension sensor measurement outputs and the vehicle body motion measurement outputs and executing suspension system instructions, and providing computer readable failure mode reference identification data for detecting a failure mode in the suspension systems; and comparing monitored suspension system data to the failure mode reference identification data to a diagnose a failure mode of the suspension systems.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principals and operation of the invention.

BRIEF DESCRIPTION OF THE DRAWINGS

FIG. 7 illustrates a tracked tank land vehicle with a controllable suspension system, with a computer system, suspension sensors and controllable force suspension members at suspension locations for controlling suspension movements between the vehicle body and tracks.

DETAILED DESCRIPTION OF THE PREFERRED EMBODIMENT

Figure 1A:
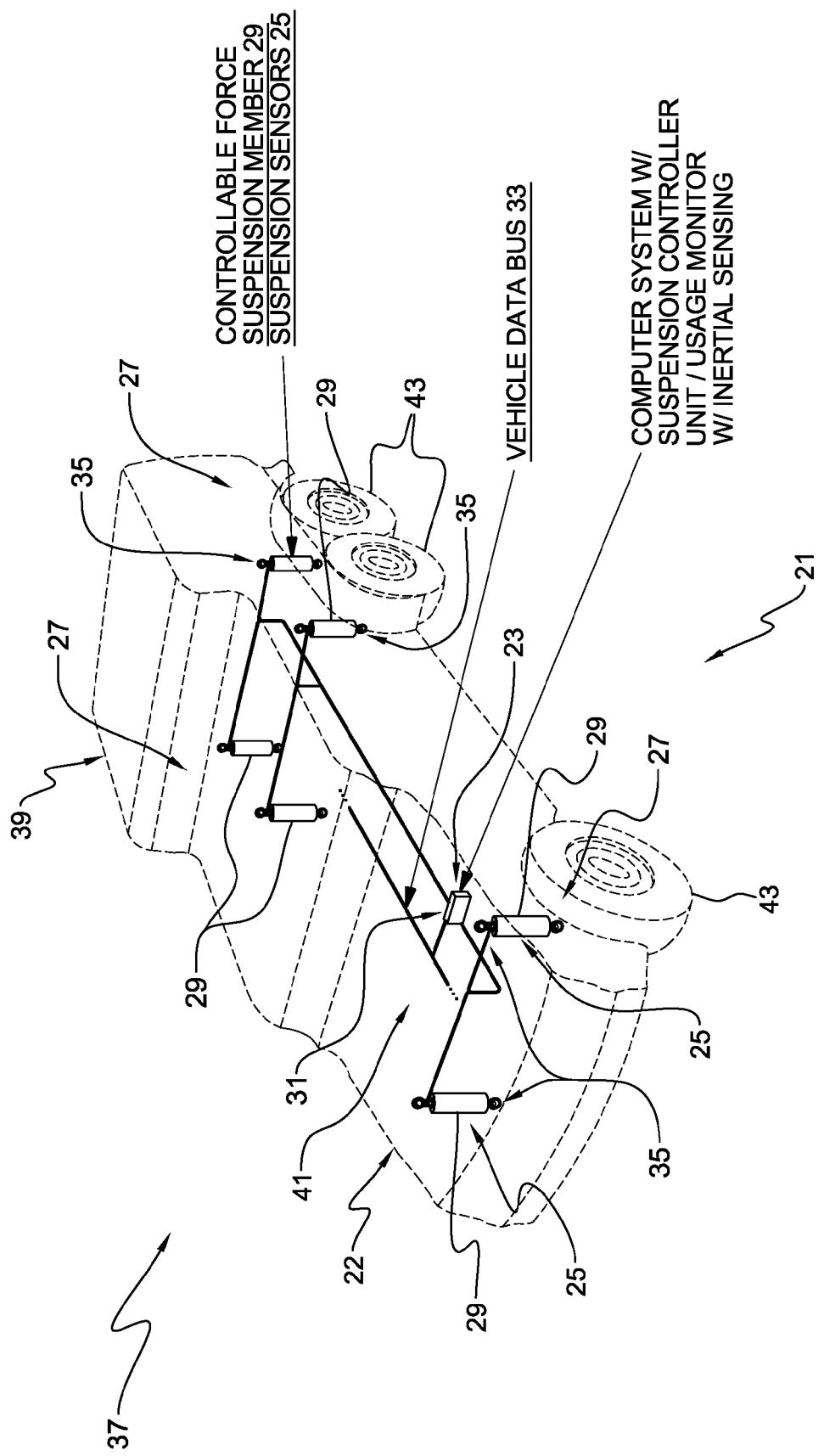
FIG. 1A-D illustrates a land vehicle with a controllable suspension system, with a computer system, suspension sensors and controllable force suspension members at suspension locations for controlling suspension movements between the vehicle body and wheels.
Figure 1B:
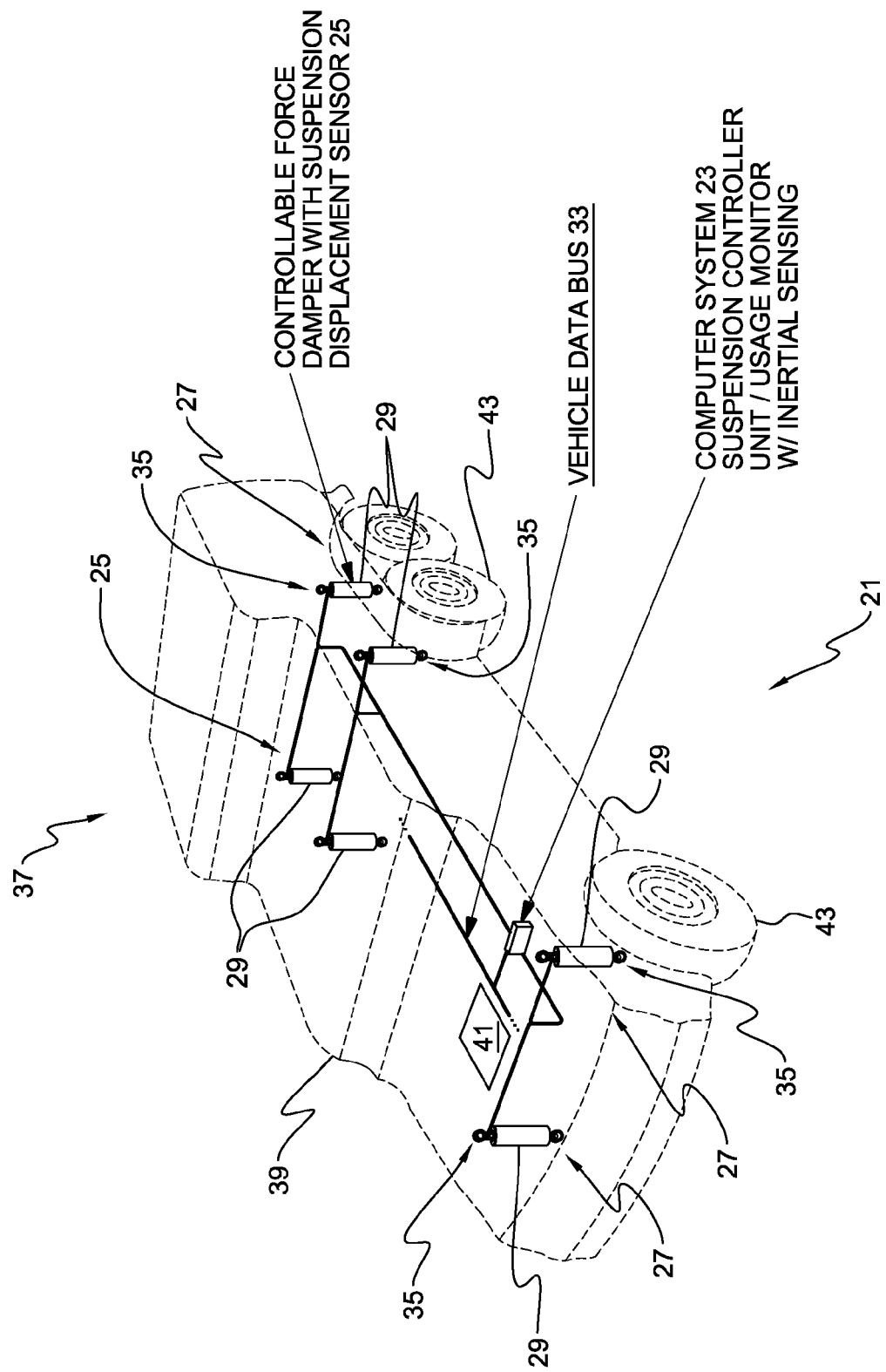
Figure 1C:
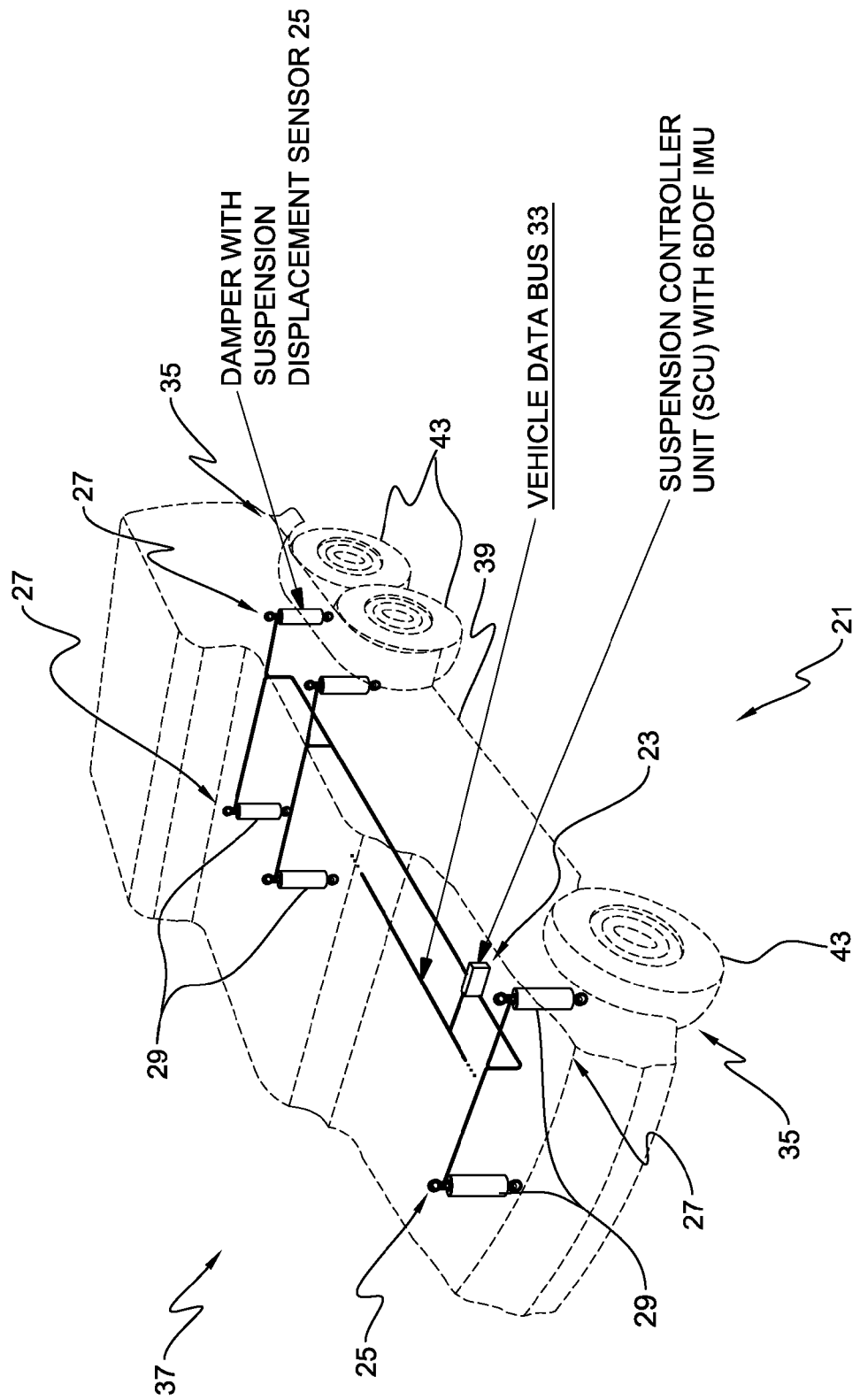
Figure 1D:
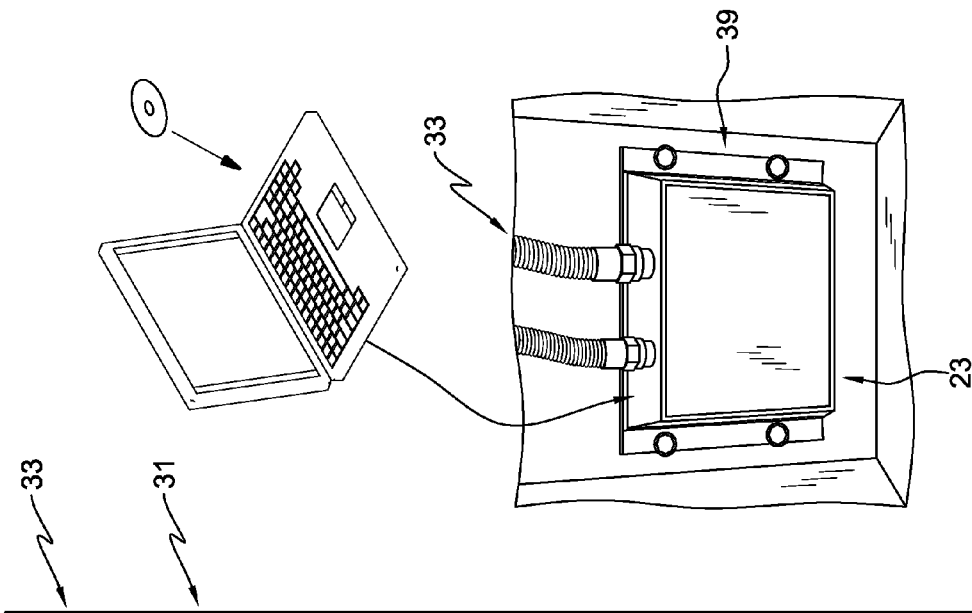
Figure 2A:
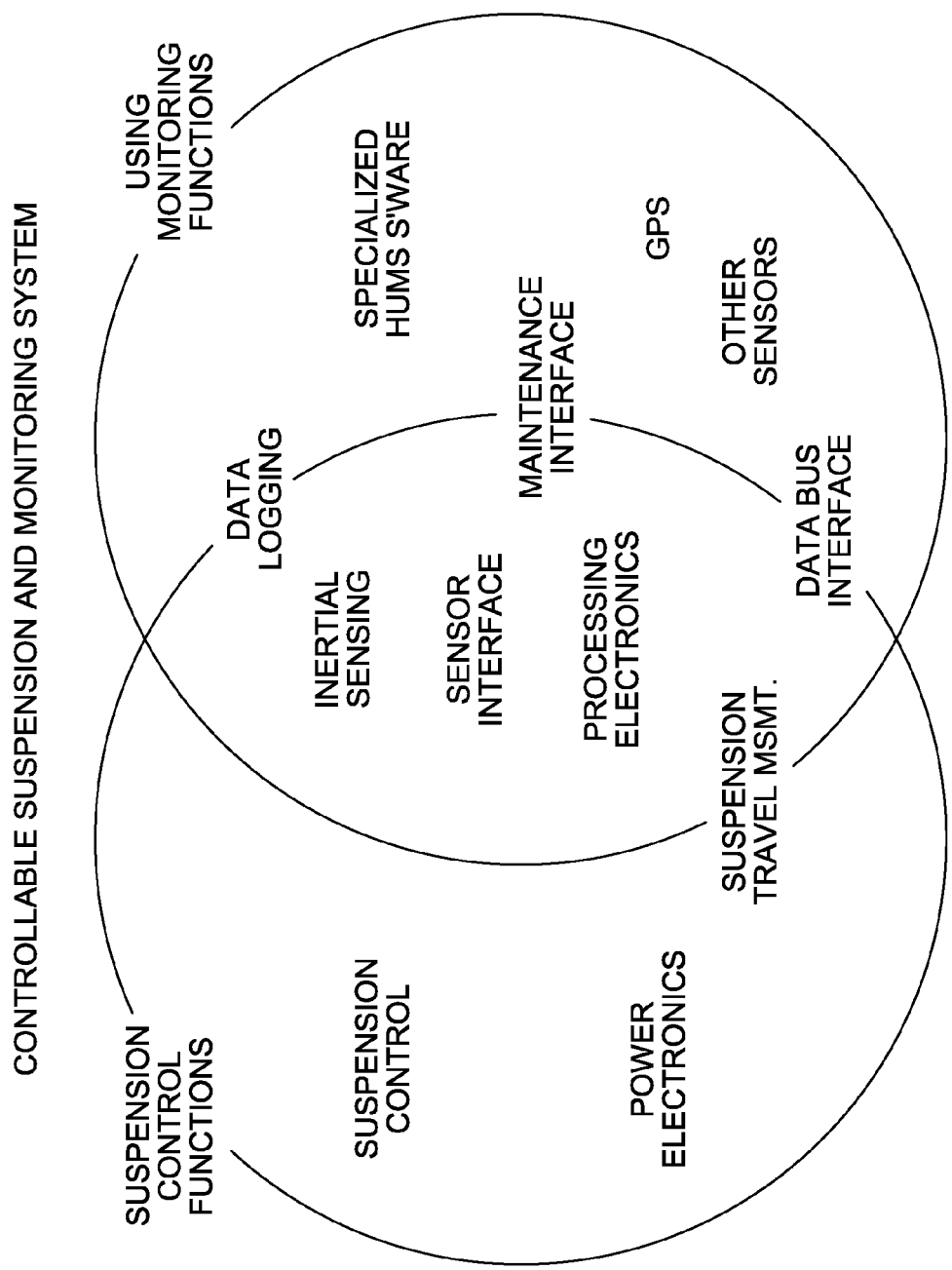
FIG. 2A-B illustrate a vehicle controllable suspension computer system with a controllable suspension system algorithm for controlling controllable force suspension members and a health usage monitoring algorithm for monitoring suspension sensor outputs and assessing a health and a usage of a land vehicle and its components.
Figure 2B:
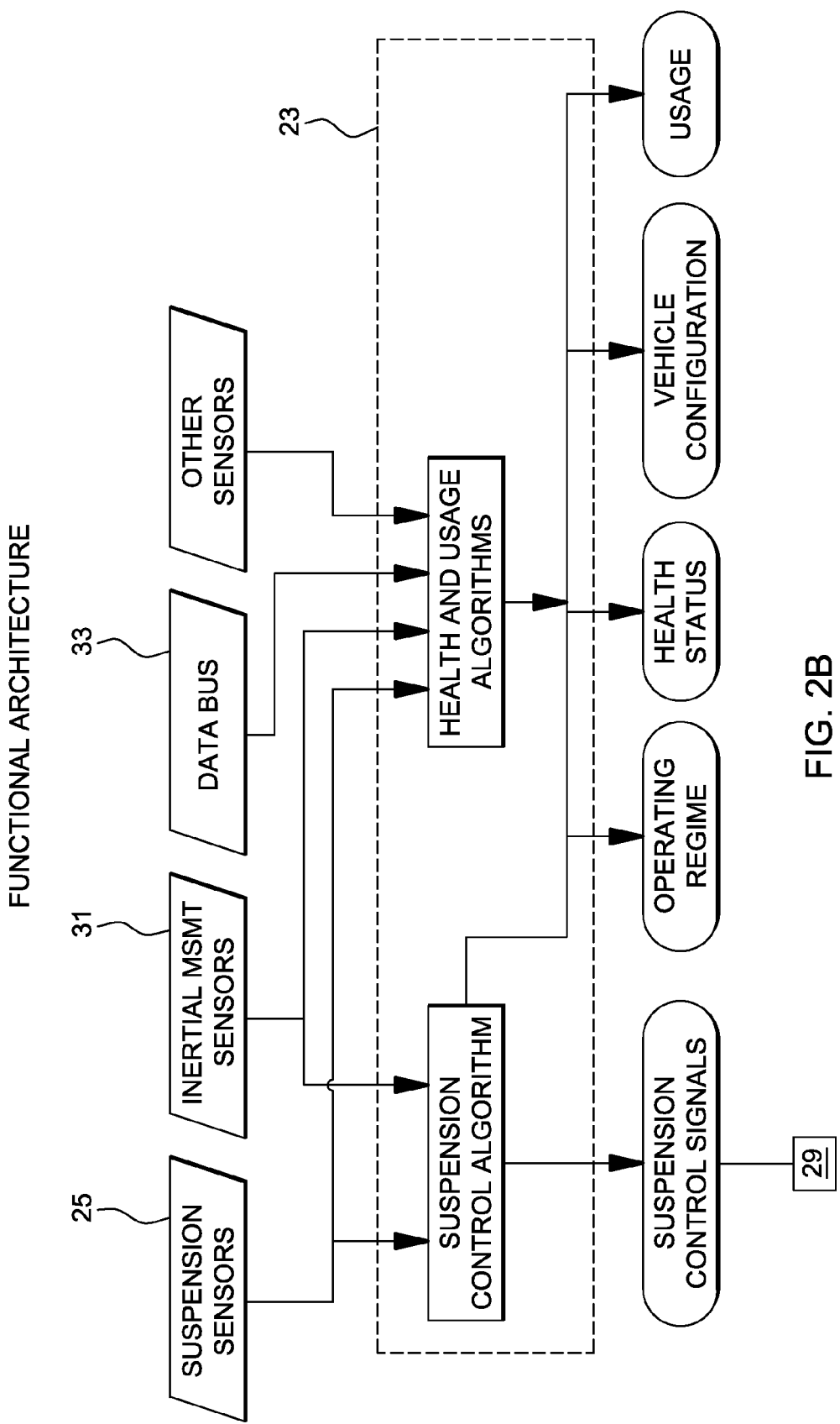
Figure 3:
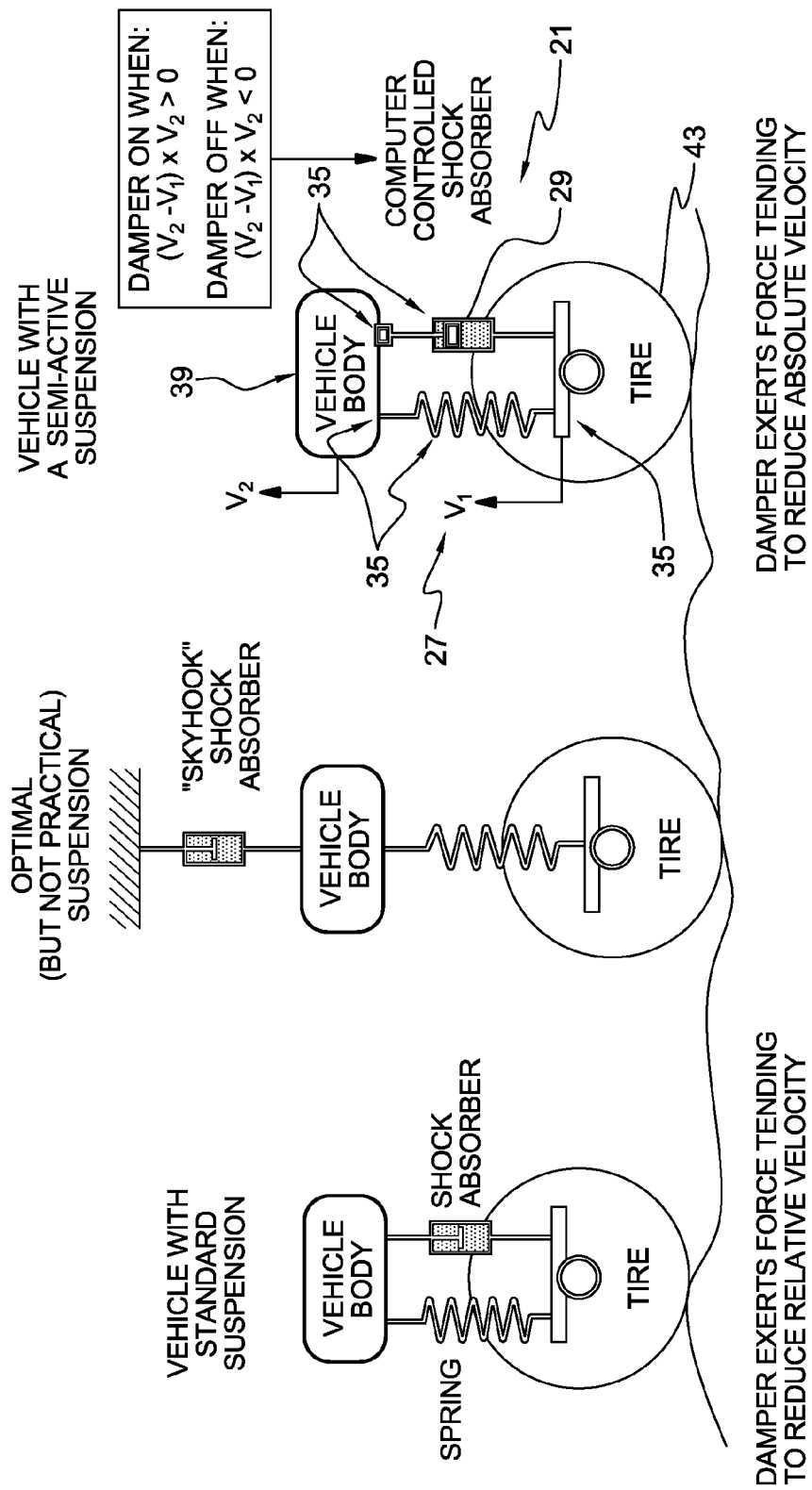
FIG. 3 illustrates a semi-active controllable suspension system.
Figure 4:
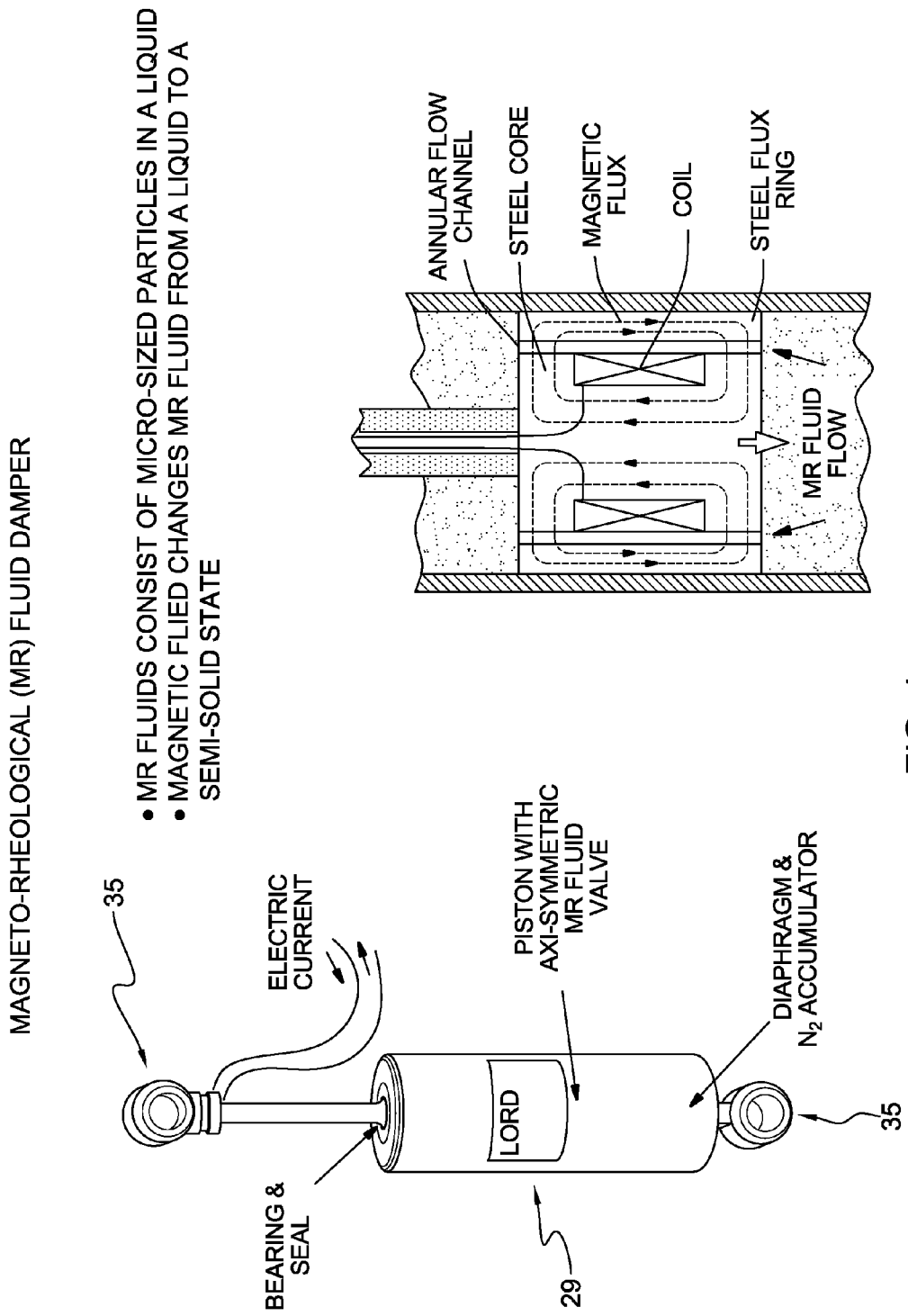
FIG. 4 illustrates a controllable force suspension member magneto-rheological fluid damper.
Figure 5:
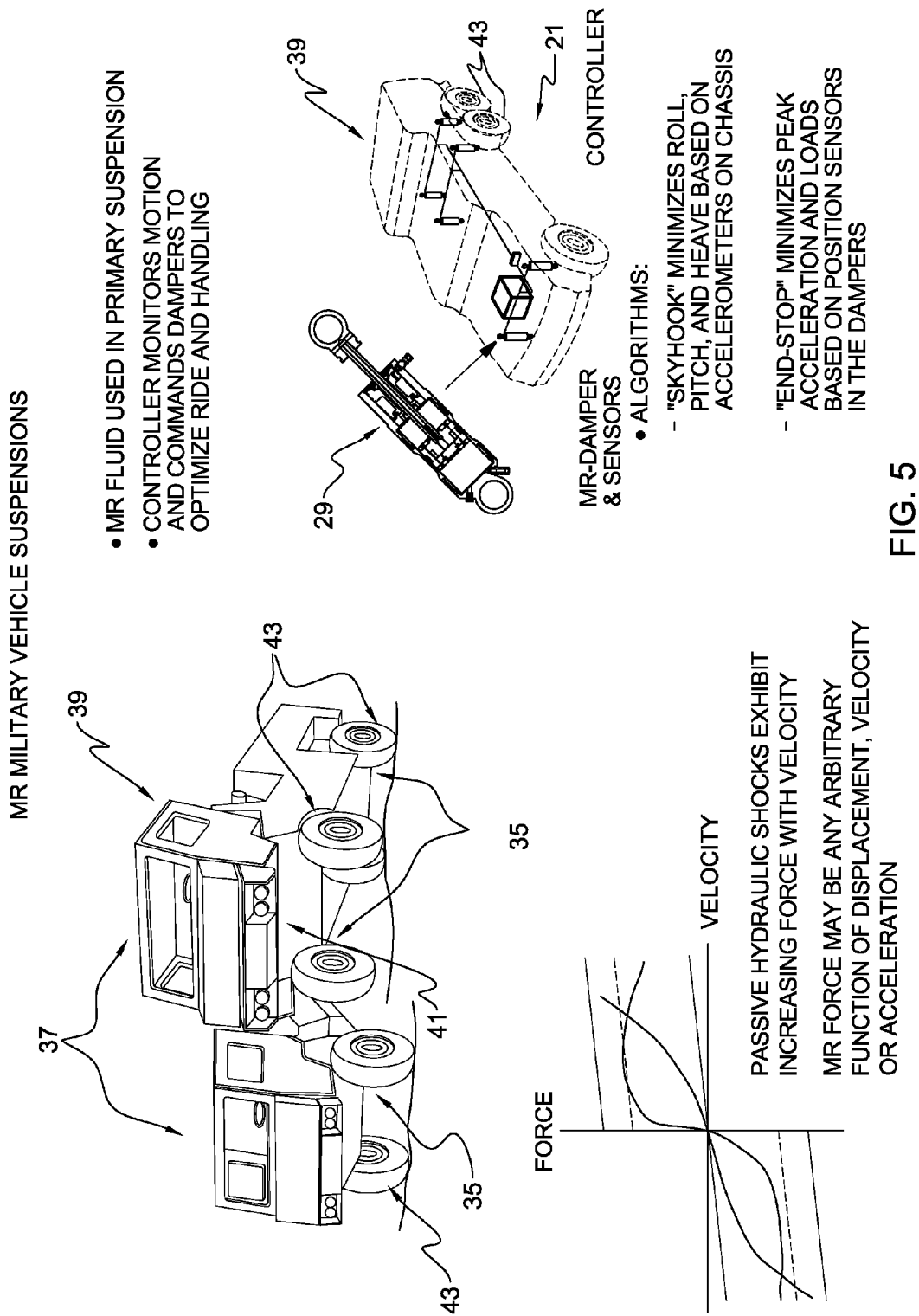
FIG. 5 illustrates land vehicles with controllable suspension systems.
Figure 6A:
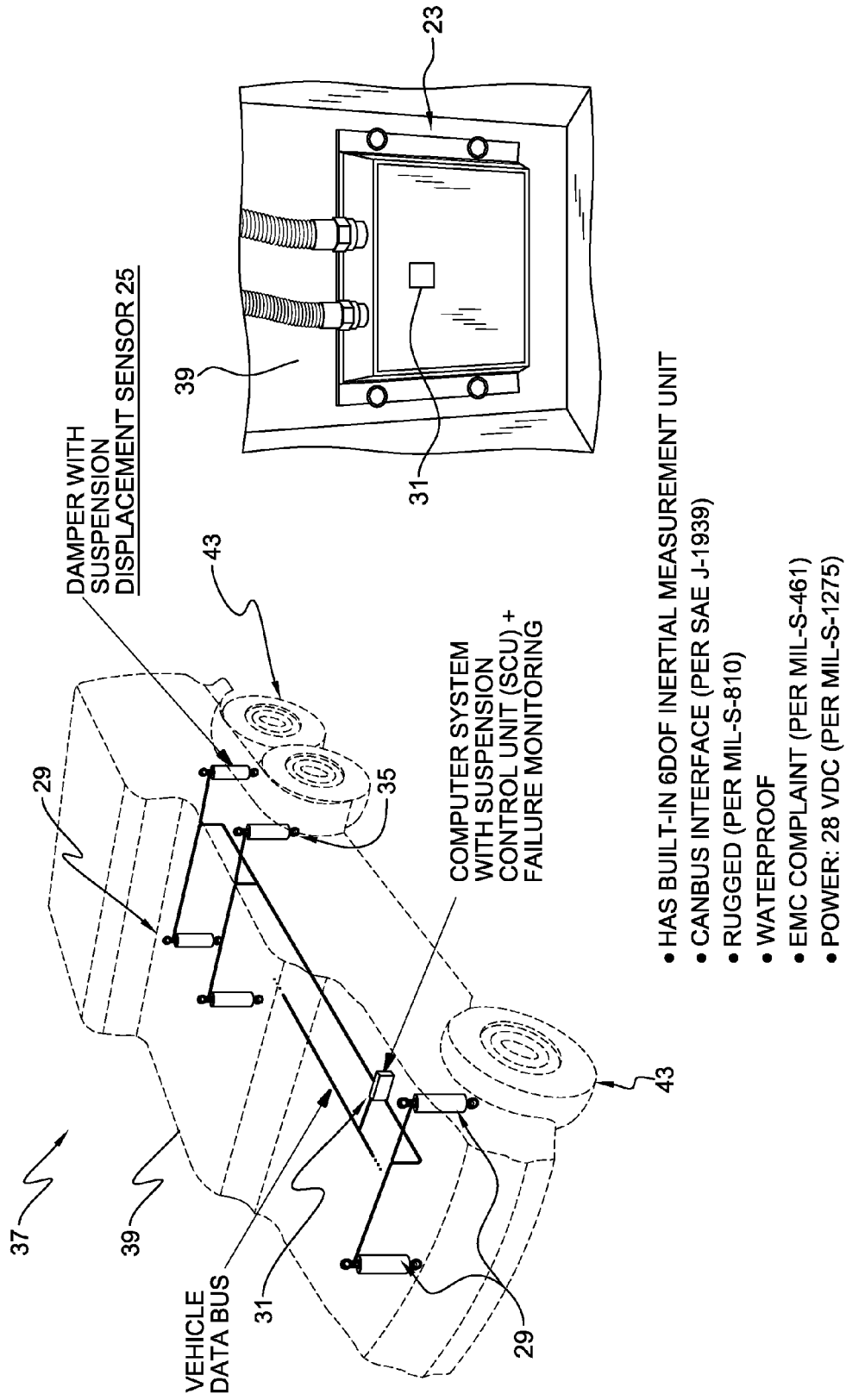
FIG. 6A-B illustrate a land vehicle with a vehicle controllable suspension computer system with a controllable suspension system algorithm for controlling controllable force suspension members and a health usage monitoring algorithm for monitoring suspension sensor outputs and assessing a health and a usage of a land vehicle and its components including failure mode monitoring of vehicle suspension components.
Figure 6B:
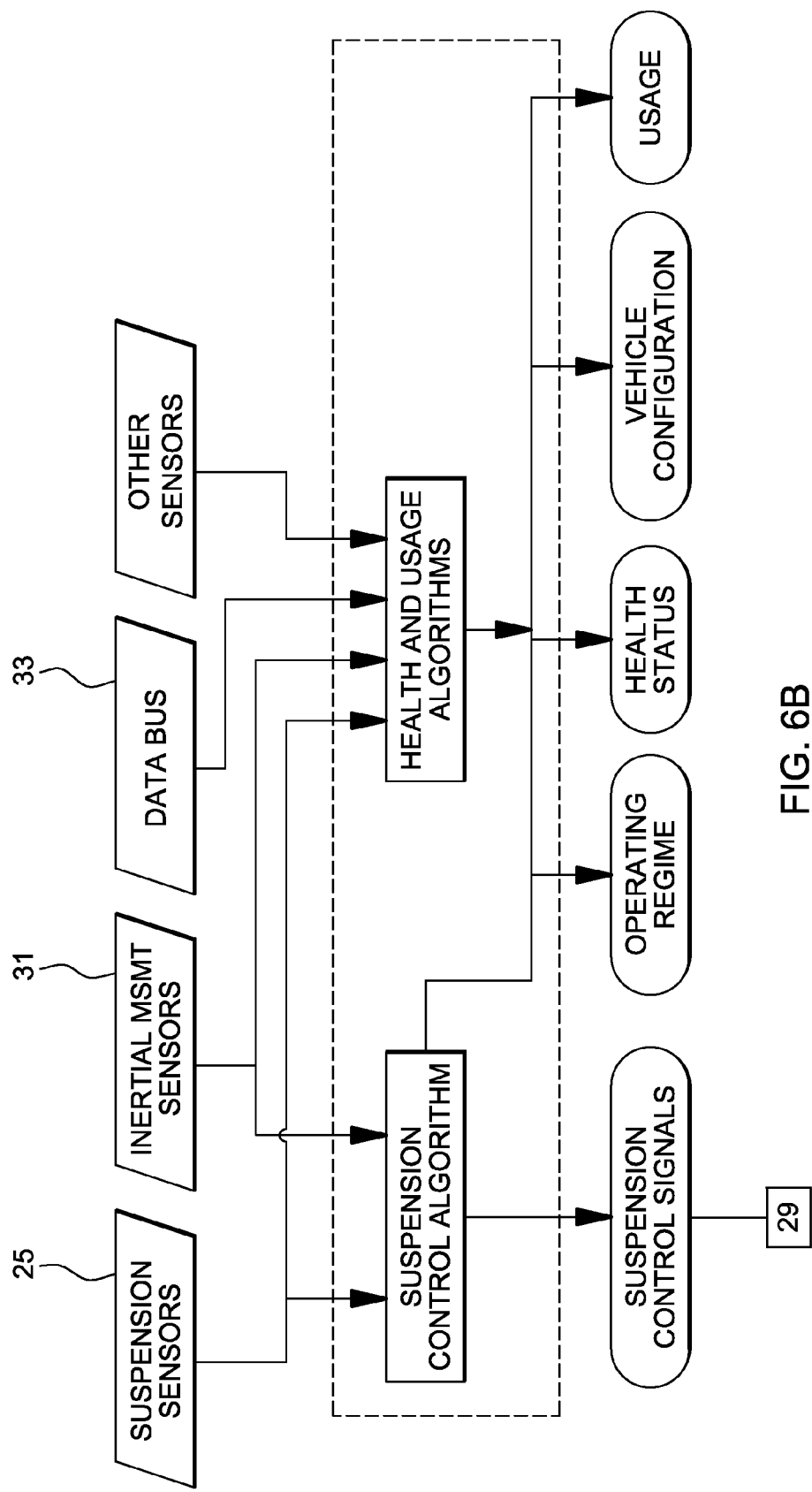
Figure 8:
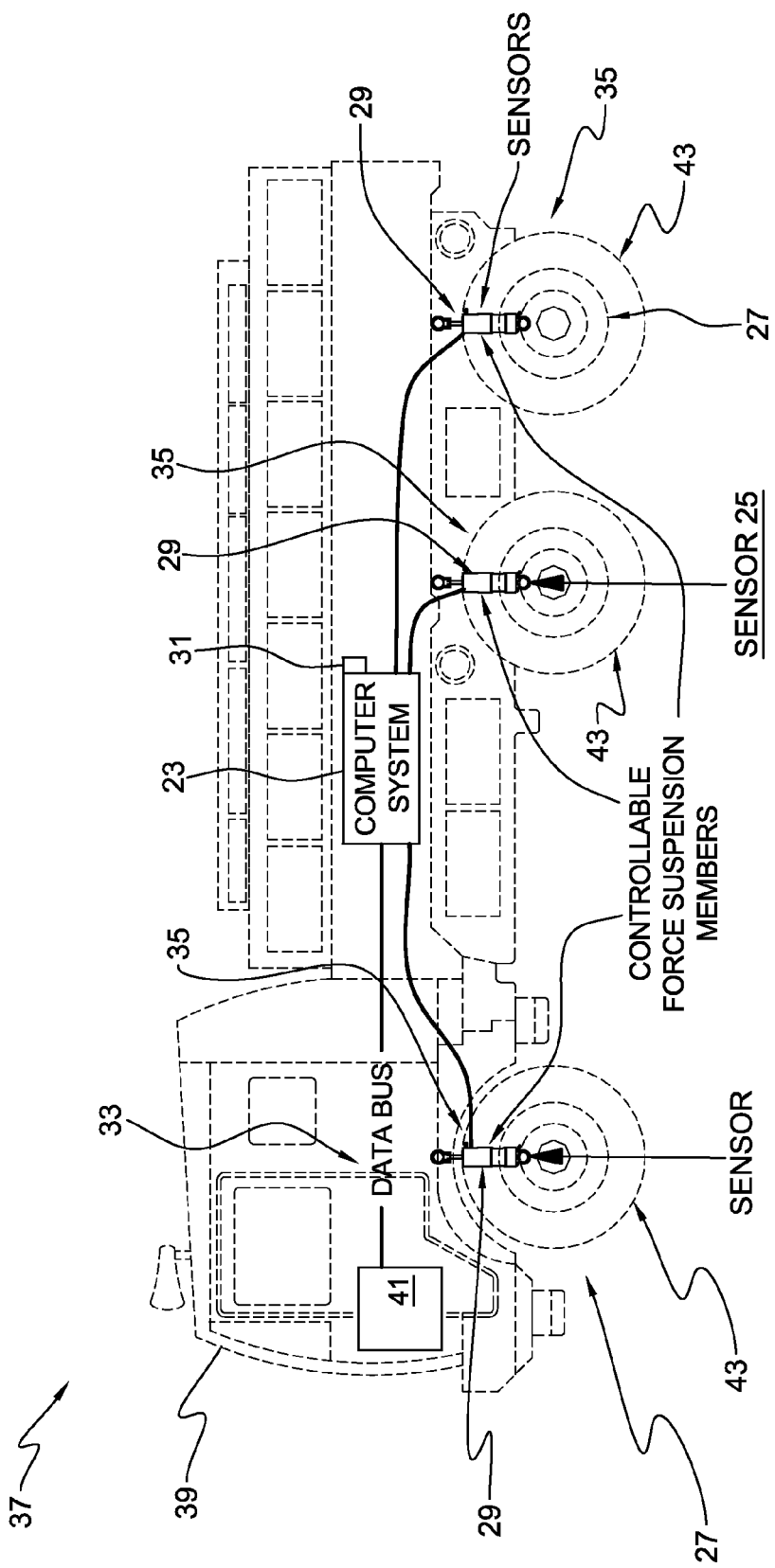
FIG. 8 illustrates a land vehicle truck with a controllable suspension system, with a computer system, suspension sensors and controllable force suspension members at suspension locations for controlling suspension movements between the truck body and wheels.
Figure 9:
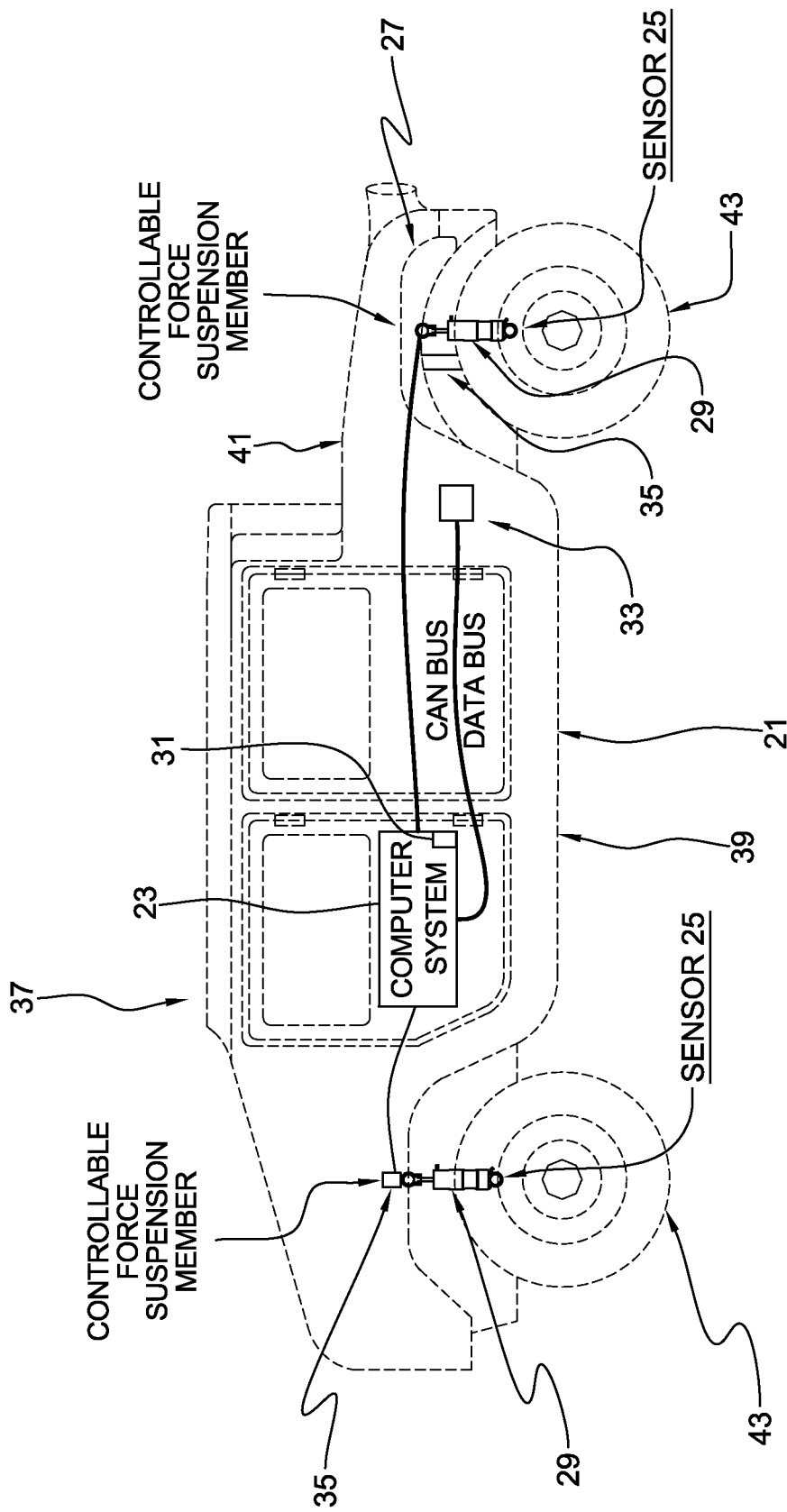
FIG. 9 illustrates a land vehicle with a controllable suspension system, with a computer system, suspension sensors and controllable force suspension members at suspension locations for controlling suspension movements between the vehicle body and wheels.
Figure 10:
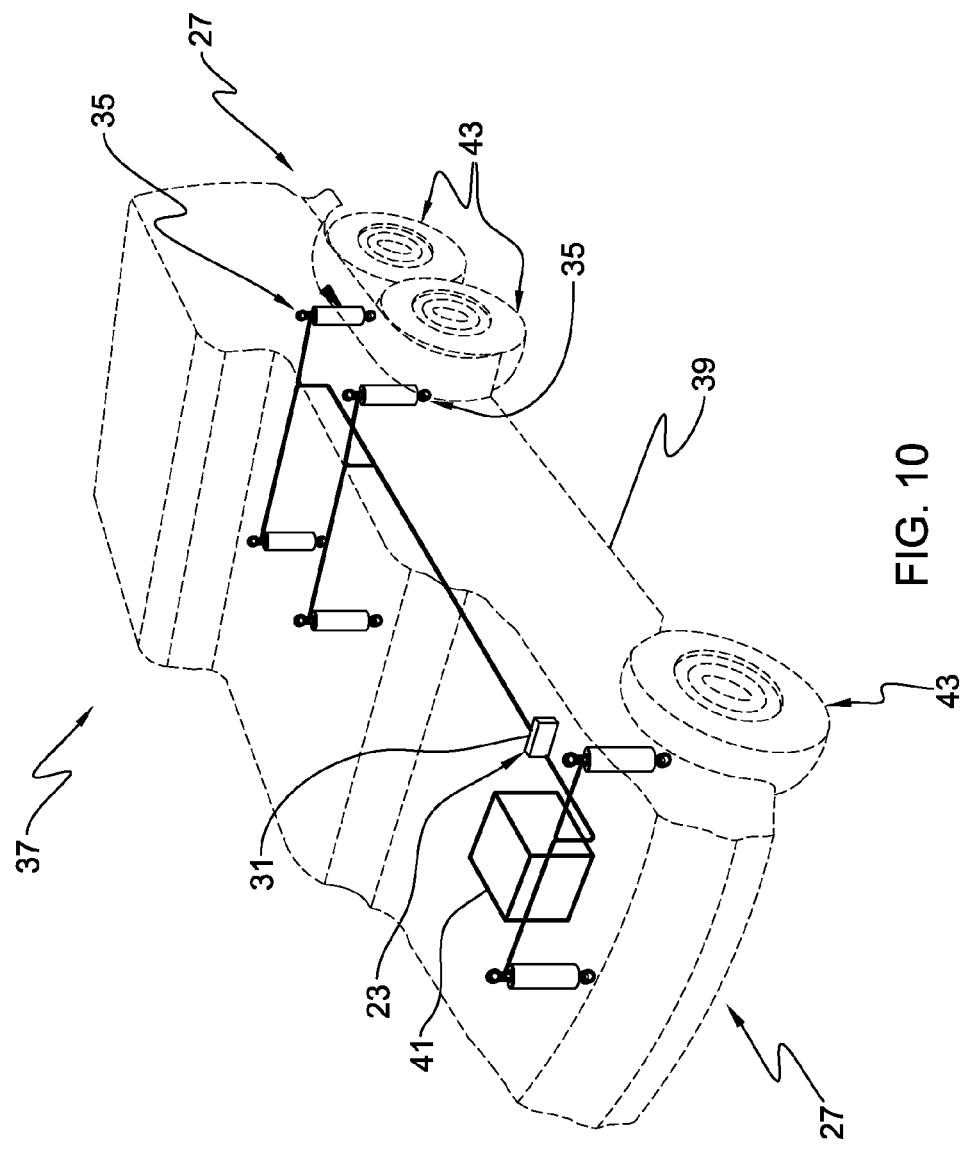
FIG. 10 illustrates a land vehicle with a controllable suspension system, with a computer system, suspension sensors and controllable force suspension members at suspension locations for controlling suspension movements between the vehicle body and wheels.
Figure 11A:
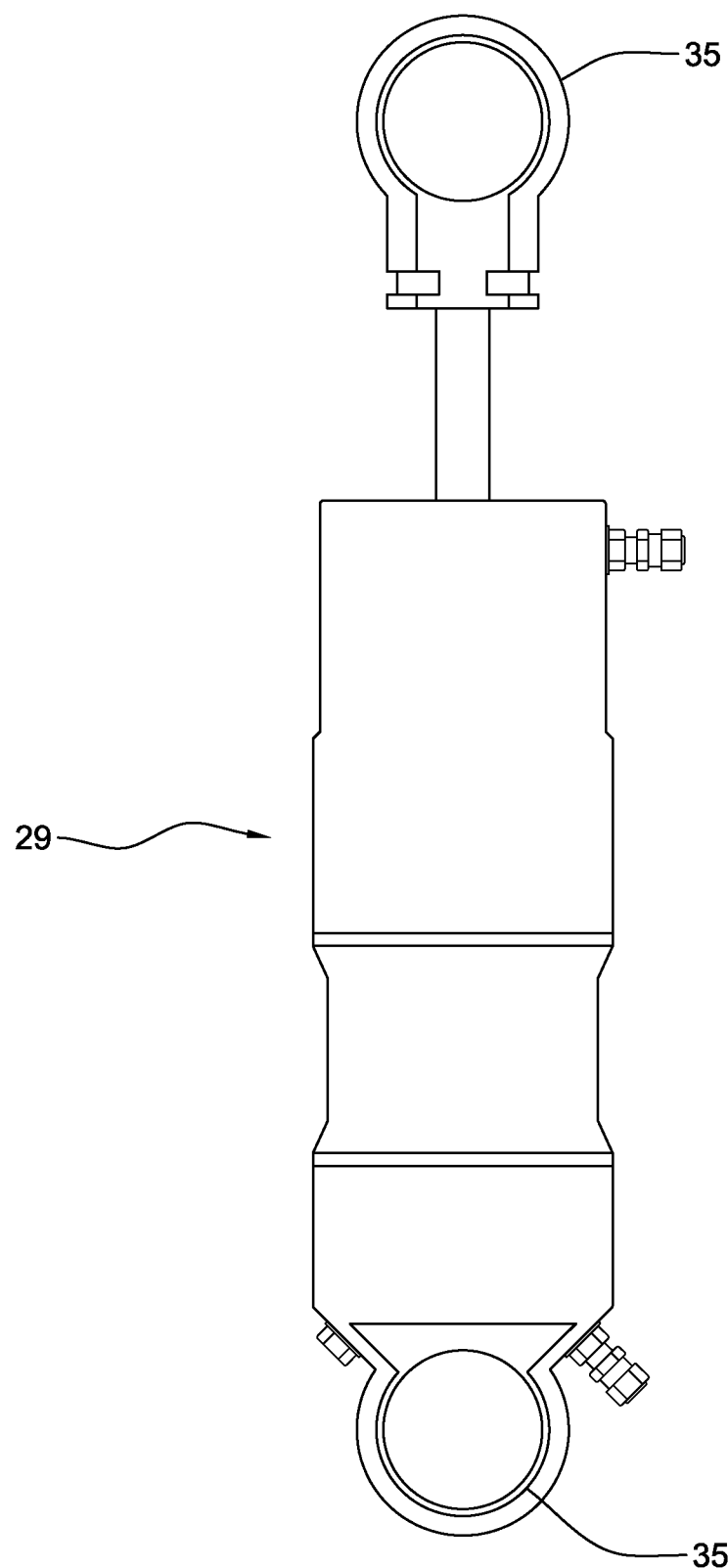
FIG. 11A-C illustrate controllable force suspension member magneto-rheological fluid dampers for controlling suspension movements.
Figure 11B:
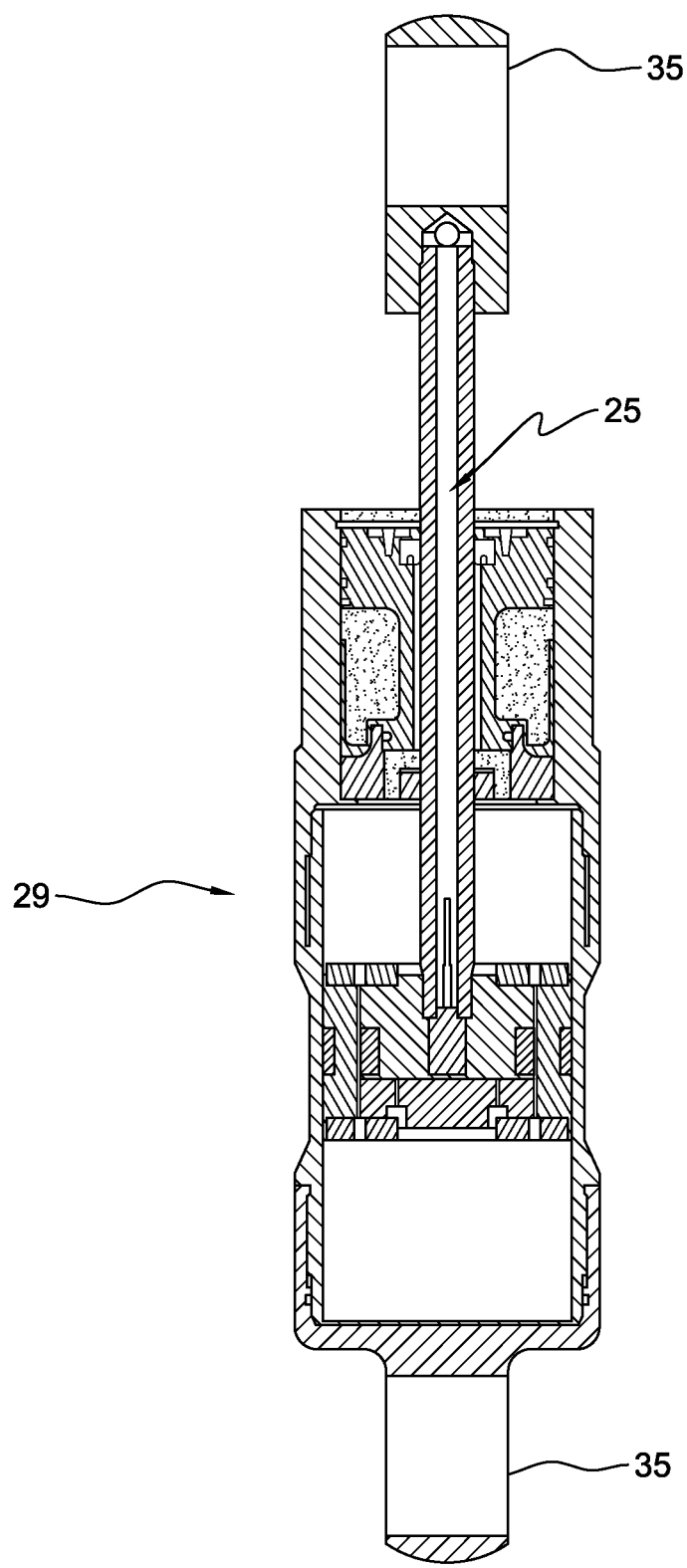
Figure 11C:
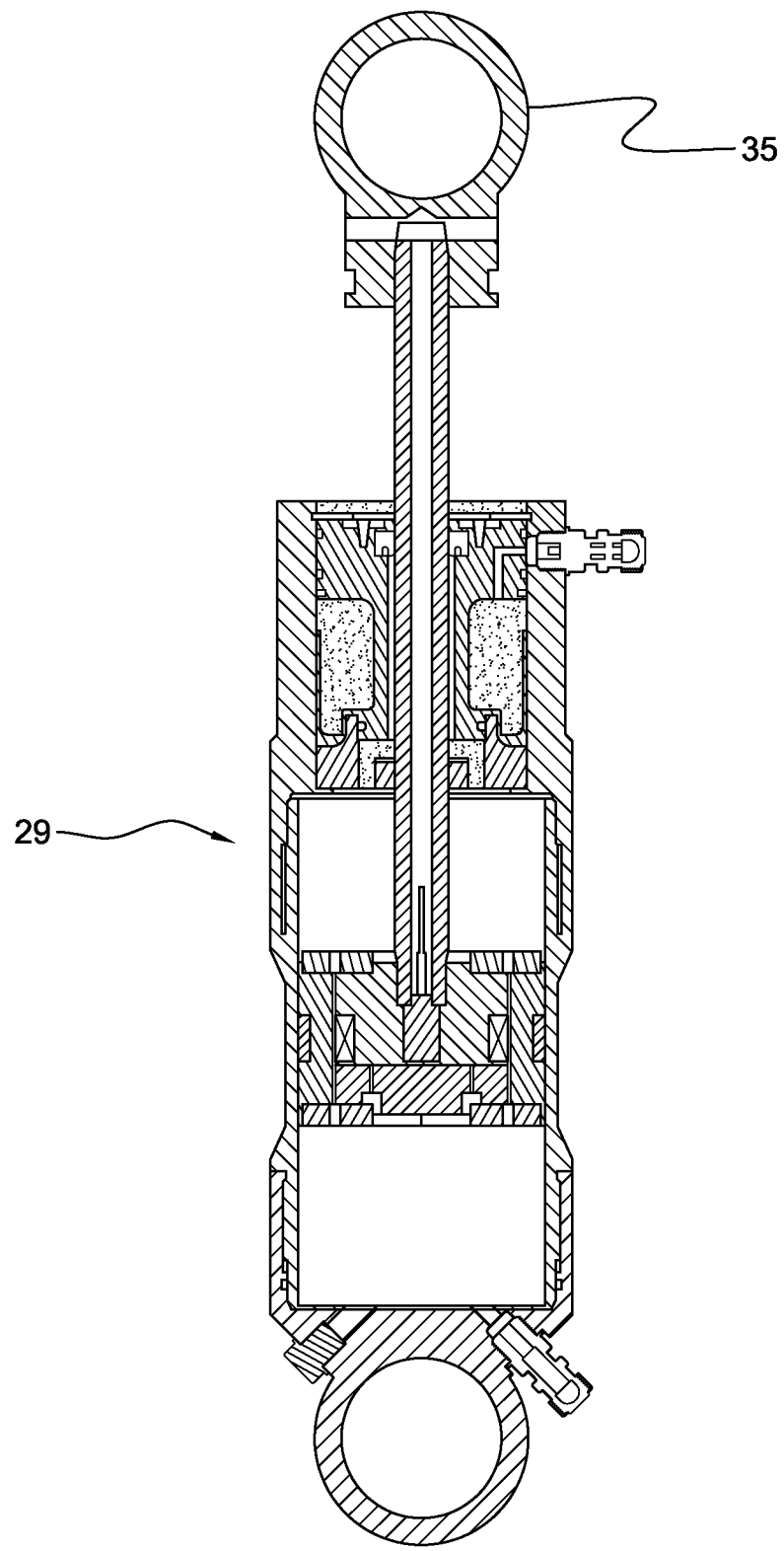
Figure 12A:
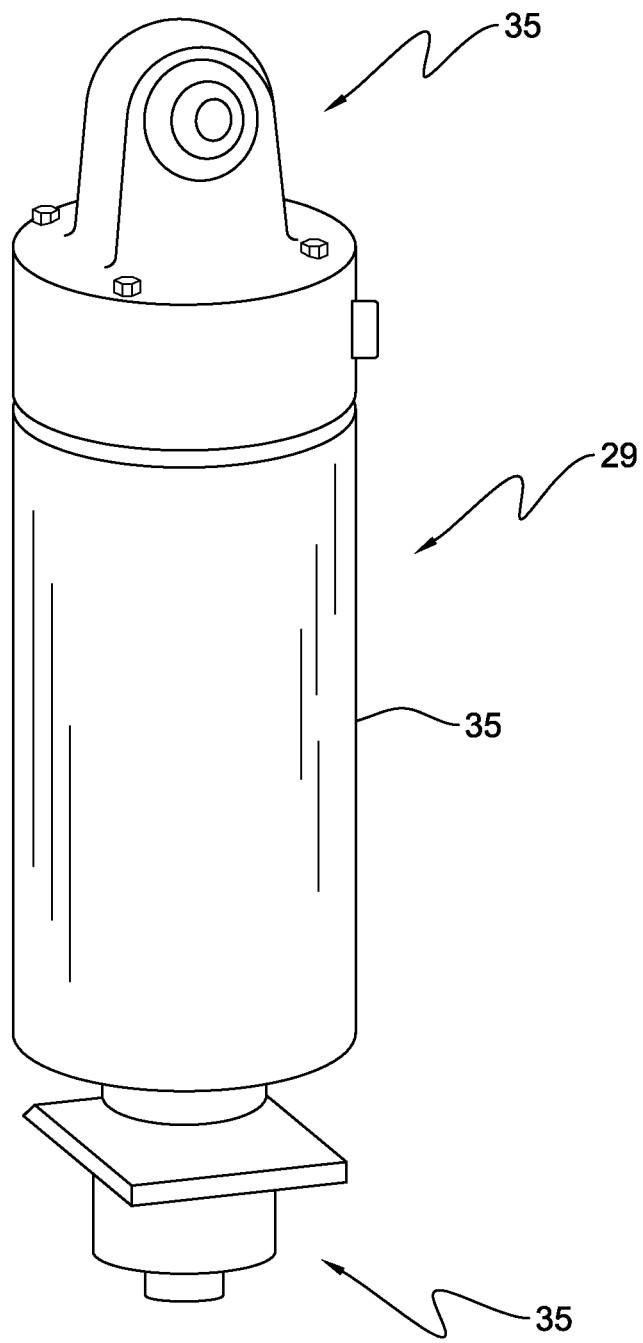
FIG. 12A-D illustrate controllable force suspension strut members with controllable adjustable air spring members and controllable force suspension member magneto-rheological fluid dampers, and a tractor land vehicle controllable suspension system.
Figure 12B:
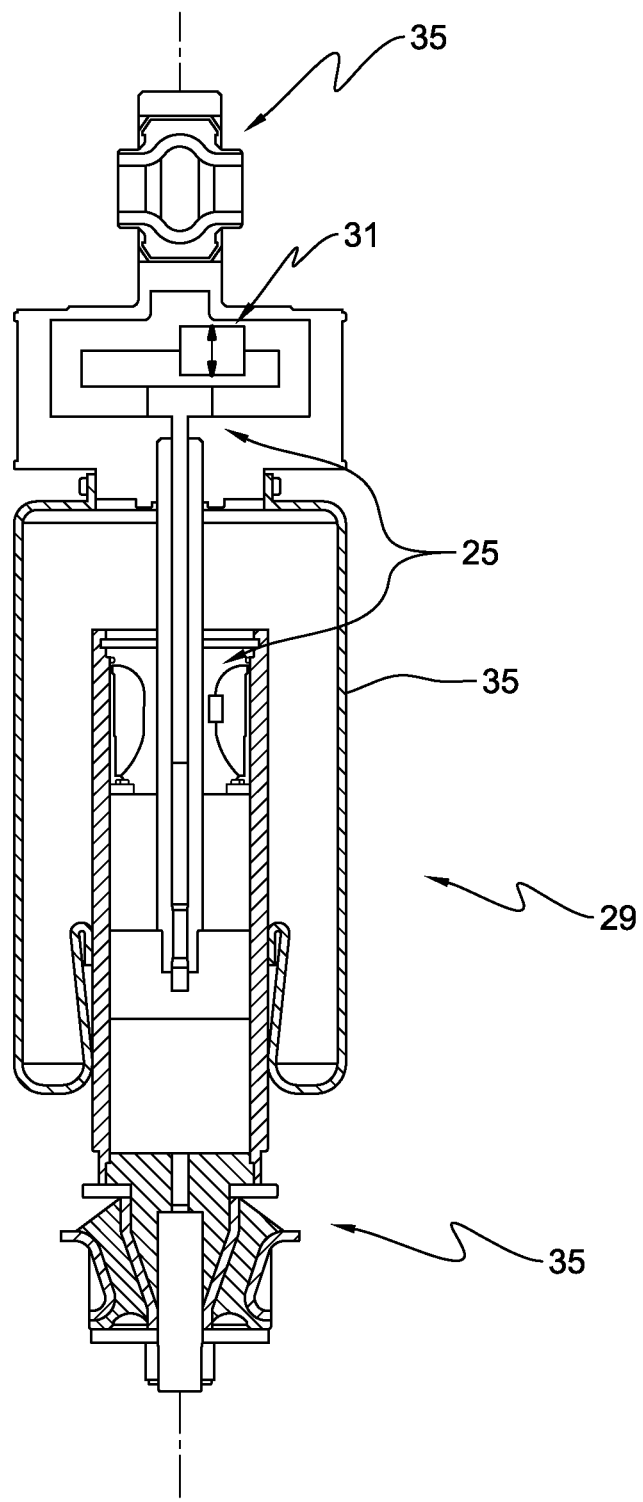
Figure 12C:
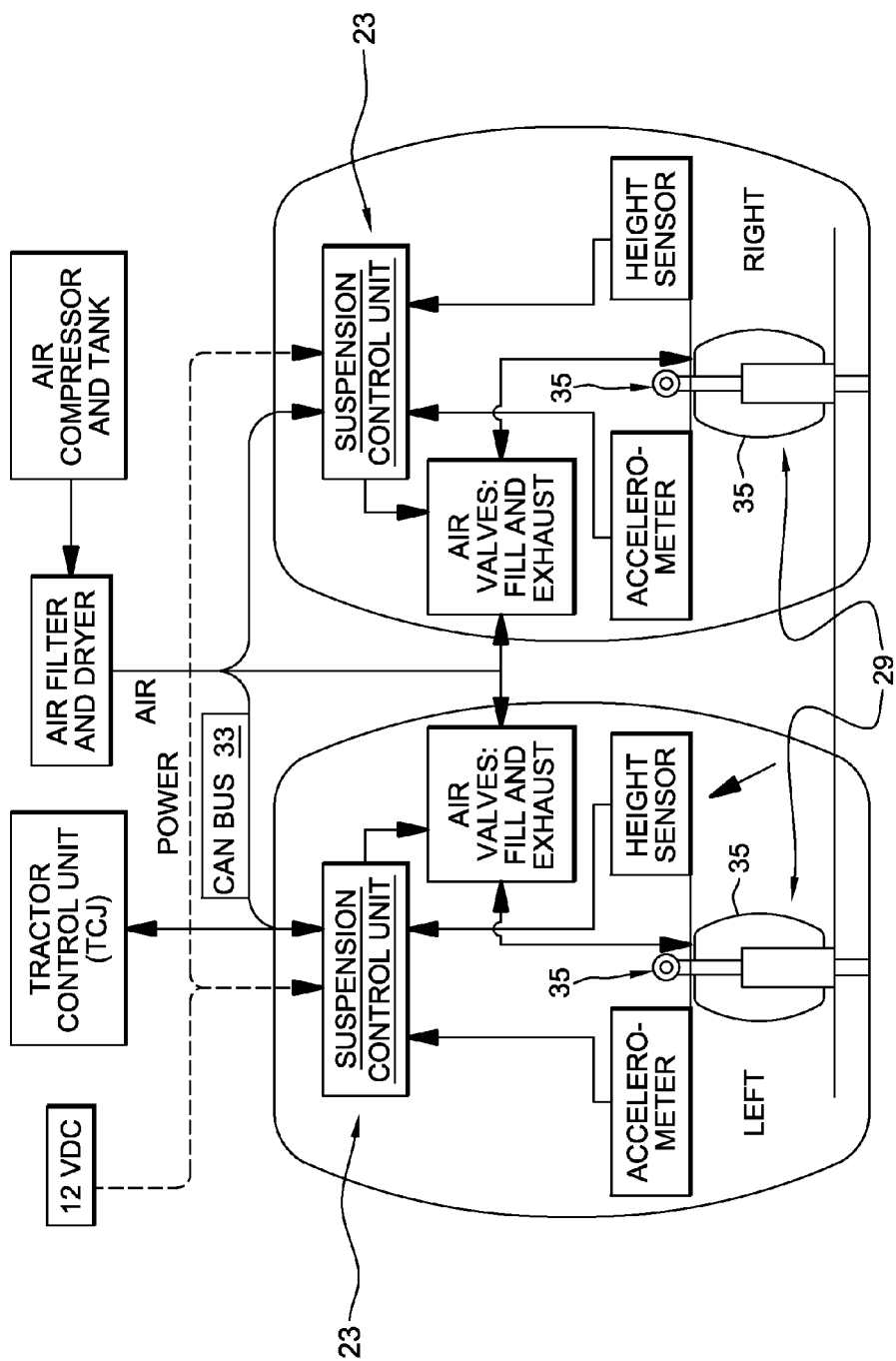
Figure 12D:
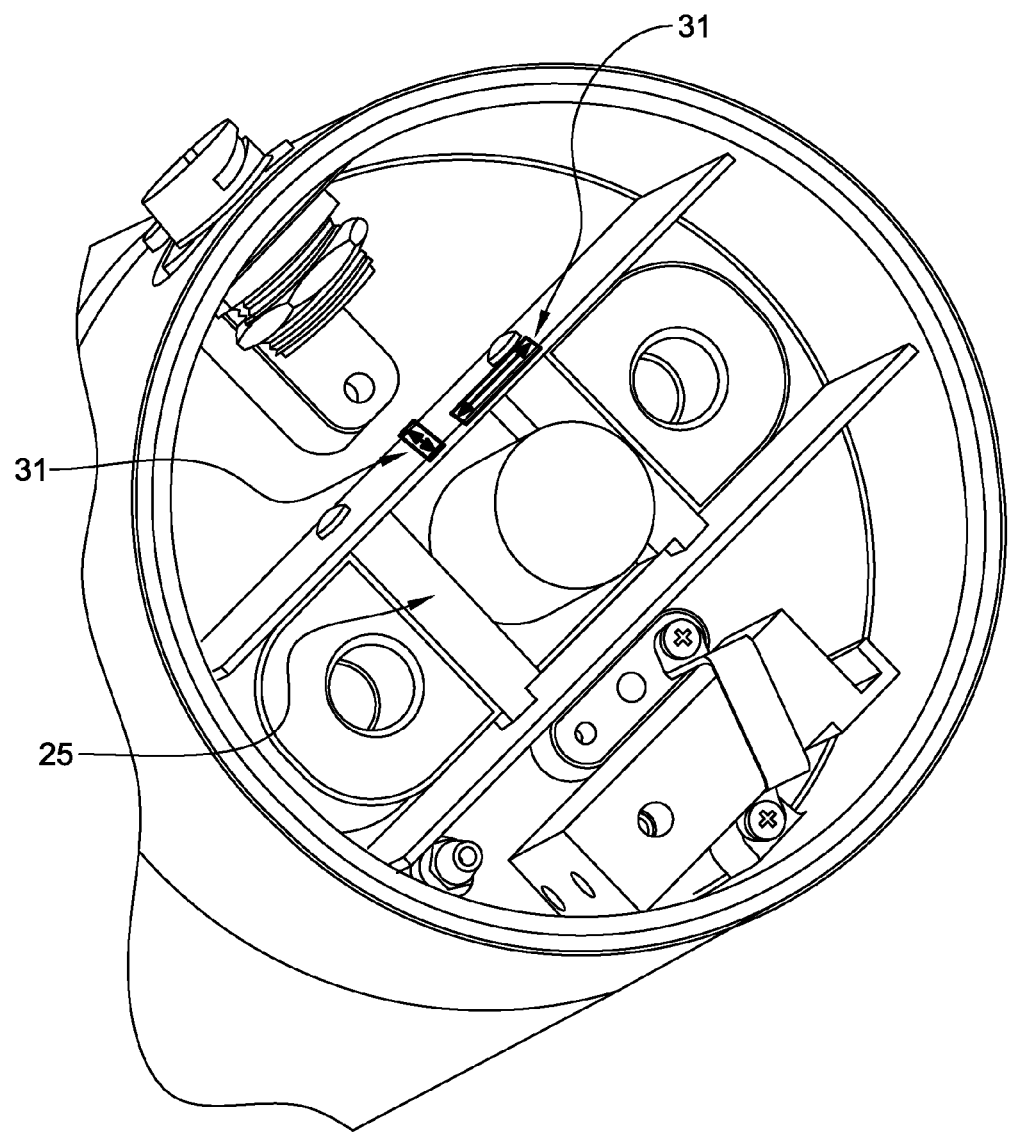

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In an embodiment the invention includes a suspension control system 21 including a computer system 23; a plurality of suspension sensors 25 located proximal to at least some of the suspension locations 27 for measuring suspension parameters; a plurality of controllable force suspension members 29 located proximal to at least some of the suspension locations 27 capable of applying forces across the suspension; a body motion sensor 31 for measuring vehicle body motion; a vehicle databus 33 interfacing with the computer system 23; wherein the computer system 23 receives the sensors' outputs and implements a suspension control algorithm for controlling the controllable force suspension members 29; and the computer system 23 monitors the health of the controllable suspension system with monitoring of the sensors and assessing the health of a plurality of vehicle suspension components 35; and the computer system 23 includes regime recognition instructions for using the sensors and data on the databus 33 for determining a vehicle operating parameter and/or a vehicle operating configuration to recognize a regime, and wherein the suspension control algorithm adjusts to the recognized regime.

In an embodiment the invention includes a land vehicle 37, the land vehicle 37 having a body 39, a power plant 41 and a plurality of land engagers 43, the land engagers 43 for engaging land and propelling the land vehicle 37 across land, the land vehicle 37 including a controllable suspension system, the controllable suspension system for controlling a plurality of suspension movements between the body 39 and the land engagers 43. In embodiments the land engagers 43 are preferably wheels. In embodiments the land engagers 43 are preferably moving tracks. Preferably the land vehicles 37 are utility vehicles, preferably non-car vehicles, preferably non-light duty utility vehicles with plurality of driven on/off-road engagers. In embodiments the vehicles are off road enabled with more than two driven wheels. Preferably the land vehicles 37 are non-light duty vehicles having gross vehicle weight >7,700 lbs, ≥8,500 lbs, ≥10,000 lbs, ≥14,000 lbs, ≥20,000 lbs, ≥24,000 lbs, ≥29,000 lbs, ≥29,000 lbs, ≥32,000 lbs, ≥33,000 lbs. Preferably the land vehicles 27 are off-road/on-road vehicles preferably designed to drive both on and off road, preferably with the land vehicles 27 designed for military missions. Preferably the land vehicles 27 are military land vehicles 27. Preferably with the non-light duty land vehicles 27, light duty vehicles are for example class A thru F2 automobiles; class MPV-B thru MPV-E multi-purpose vehicles; class SUV-A thru SUV-E sport utility vehicles; class PUP-B thru PUP-D pickup trucks; class CDV, MIC, MVAN vans (reference Global Insight World Car Industry Forecast Report, December 2006).

The land vehicle 37 with land engagers 43 and controllable suspension system for controlling suspension movements between the body 39 and the land engagers 43 includes a computer system 23 with computer readable medium; and a plurality of suspension sensors 25 located proximal to at least some of the land engagers 43 suspension locations 27, for measuring a plurality of suspension parameters representative of suspension movements between the body 39 and the land engagers 43 and outputting a plurality of suspension sensor measurement outputs; a plurality of controllable force suspension members 29 located proximal the land engagers 43 and the suspension sensors 25, the controllable force suspension members 29 for applying a plurality of controllable suspension travel forces between the body 39 and the land engagers 43 to control the suspension movements. In a preferred embodiment the controllable force suspension members 29 are dampers, preferably controllable force dampers with suspension displacement sensors.

The controllable suspension system includes a body motion sensor 31, the body motion sensor 31 for outputting a plurality of vehicle body motion measurement outputs. In a preferred embodiment the body motion sensor 31 is an inertial sensor, and is preferably integrated with in the computer system 23 with the suspension controller unit and the usage monitor.

The vehicle includes a vehicle databus 33 interfacing with the computer system 23, the vehicle databus 33 communicating a plurality of vehicle data communication signals with the computer system 23.

Preferably the computer system 23 receives the suspension sensor measurement outputs and the vehicle body motion measurement outputs and the computer readable medium includes first program instructions with the computer system 23 executing a controllable suspension system algorithm for controlling the controllable force suspension members 29 to control vehicle body motion and the suspension movements between the body 39 and the land engagers 43, and the computer readable medium including second program instructions with the computer system 23 executing a health usage monitoring algorithm for monitoring the outputs and assessing a health and a usage of a vehicle suspension component.

Preferably the vehicle includes the suspension usage monitoring functionality with the controllable semi-active suspension. Preferably with the system the usage monitoring function accesses suspension component data such as suspension displacements, damper dissipated power and temperatures. Preferably with the system different suspension control algorithms or gains are employed based on usage identified mission profiles or usage regimes to provide improved performance and/or improved mission reliability. Preferably with the system the suspension control algorithm and the monitoring utilize the additional data from the vehicle data bus (preferably engine rpm, steering angle, tire speeds, brake engagement) and associated regimes to improve performance and failure detection. Preferably with the body motion inertial measurement system and the suspension displacement sensors the system provides a vibration and load dosimeter. Preferably with the body motion inertial measurement system and the suspension displacement sensors the system provides an indication of the health of suspension components 35. Preferably with the body motion inertial measurement system and the suspension displacement sensors the system provides an improved terrain mapping. Preferably with the body motion inertial measurement system and the suspension displacement sensors the system provides an estimation of gross vehicle weight and CG, center of gravity, location. Preferably with the usage monitoring system with the inertial measurement system and the suspension displacement sensors the vehicle system provides a vibration and load dosimeter. In particular, the displacement sensors across the suspension system preferably sense and record loads to the vehicle chassis coming through the suspension. This, in combination, with vibration sensing can be used to assess load and vibration history of the vehicle and provide a measured basis for prognostics based on, for example, fatigue accumulation. Preferably with the usage monitoring system with the inertial measurement system and the suspension displacement sensors provide an indication of the health of vehicle suspension components 35, such as vehicle suspension springs, bushings, tie-rods, and associated vehicle components which are associated and connected with the suspension. The vehicle monitoring system detects anomalies in these sensor signals when compared to baseline (healthy suspension) signals. This system also provides faulty component isolation to enable faster "pit-crew style" human maintenance with the human maintainers preferably provided advanced communication of the needed repair and required suspension components 35 for the repair. Furthermore, the suspension control system 21 preferably modifies the suspension control policy in the event of a suspension component failure or impending failure to provide an optimal limp-home mode, preferably by controllably limiting the force through a controllable force suspension member that has a detected failure or impending failure mode.

Figure 13:
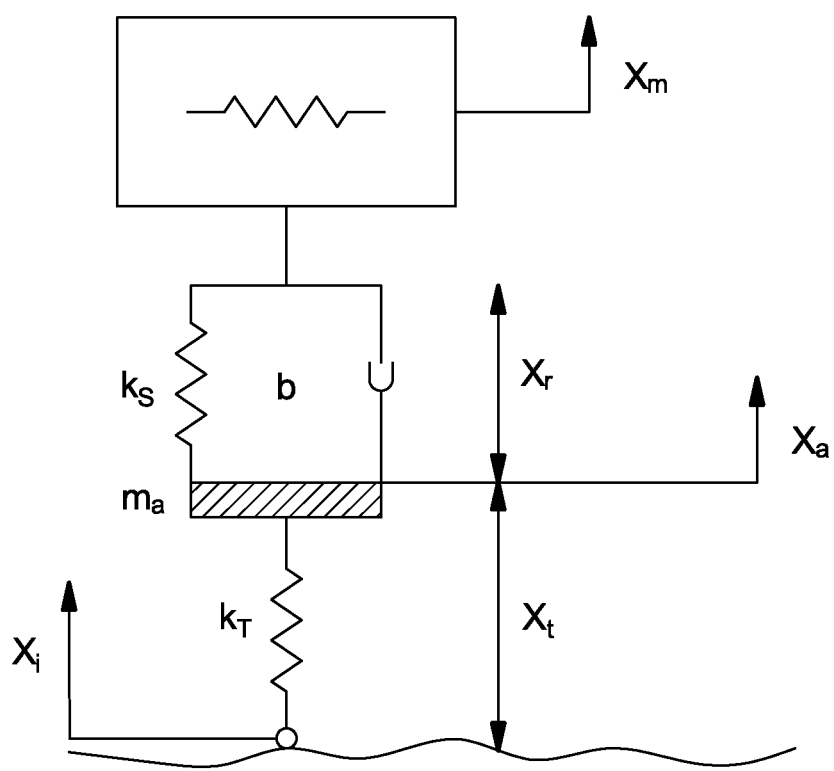
FIG. 13 illustrates a land vehicle controllable suspension system single vehicle suspension corner with terrain mapping of the land engaged by the land engager of the land vehicle.

In an embodiment the vehicle system provides for geographic terrain mapping of the land engaged by the land engagers 43. The body motion sensor 31 inertial measurement system and the suspension displacement sensors preferably provide improved terrain mapping. Consider the single vehicle suspension corner illustrated in FIG. 13 where $x_i$ is the terrain profile, $x_t$ is the time displacement, $x_r$ is the suspension displacement which is measured and $x_m$ is the corner body displacement which can be estimated from the inertial measurement system in high-pass-filtered manner. The terrain profile is approximated by $$x_i = x_m - x_r - x_t$$

where $x_m$ and $x_r$ are known, but $x_t$ must be approximated by one of the following ways.

a. Assume $k_t \gg k_s$ such that $x_t \ll x_r$, then $x_t$ is assume negligible.

b. Assume tire damping and $m_a$ are small (i.e., $k_t/m_a \gg k_s/m$). Then, $$x_t = \frac{1}{k_t}(k_s x_r + b(\dot{x}_r)\dot{x}_r)$$

If no land engaging tire lifting is assumed and masses and spring rates are known, then xt can be approximated by passing measure signals through $2^{nd}$ order filters based on system dynamic modeling.

Further accuracy in terrain mapping can be derived from averaging front and rear corner estimations on the vehicle. This may, for example, help remove data anomalies due to land engaging tire lift.

This terrain mapping technique provides the terrain characteristics that have relatively high spatial frequency (bumps, pot holes, ditches, etc.)—the cut-off of which is vehicle speed dependent. Low spatial frequency terrain characteristics, such as hills, can be estimated from an on-board geographic positioning input such as on-board GPS (Global Positioning Satellite) with known accuracy limits.

Preferably with the system the suspension displacement sensors out provide the system with inputs for a calculation of an estimation of gross vehicle weight and CG (center of gravity) location. This is preferably done by simple statics equations based on suspension displacement measurements. Such information is preferably used to detect exceedance, or determine excess capacity, or for usage monitoring, or for route planning, or to monitor fuel burn or payload depletion, preferably to monitor the payload depletion of expendable payloads such as vehicle carried ammunition.

Preferably the system monitoring provides access to suspension component data from the sensors such as suspension displacements, damper dissipated power and damper temperatures. Preferably different suspension control algorithms or gains are employed based on identified mission profiles or usage regimes to provide improved performance and/or improved mission reliability.

Preferably with the vehicle the computer system 23 computer readable medium includes third program instructions with the computer system 23 executes a regime recognition algorithm for using the outputs and the vehicle data communication signals from the databus 33 to determine a vehicle operating parameter. Preferably with the vehicle the computer system 23 computer readable medium includes third program instructions with the computer system 23 executes a regime recognition algorithm for using the outputs and the vehicle data communication signals from the databus 33 to determine a vehicle operating configuration. Preferably the regime recognition algorithm identifies the type of terrain that the vehicle is engaging, and preferably modifies the controllable suspension system algorithm in accordance with the identified terrain type.

Preferably the regime recognition algorithm identifies a vehicle operating configuration, such as a the vehicle weight cargo, fuel, personnel, and/or how the vehicle is functioning and driving and preferably modifies the controllable suspension system algorithm in accordance with the vehicle operating configuration. Preferably with the vehicle the computer system 23 regime recognition algorithm identifies both regimes internal to the vehicle and regimes external to the vehicle, and modifies the controllable suspension system algorithm in accordance with such recognized regimes. The regime recognition includes data from the suspension sensors 25 and body motion and the databus 33 with the regime recognizing the internal and external environmental conditions such as payload how the land engagers 43 are engaging the land such as a muddy off road, the body motion such as on a steep slope, with the controllable suspension system algorithm modified in response to the regime recognition algorithm, preferably with different algorithm gains depending upon the external environment regime, such as type of terrain and/or internal environment regime, such as location of vehicle CG. The controllable suspension system algorithm is preferably modified in response to the regime recognition algorithm. Preferably the regime recognition algorithm utilizes the sensor outputs and the vehicle data communication signals from the databus 33 to determine at least a vehicle operating parameter and a vehicle operating configuration and wherein the controllable suspension system algorithm is modified in response to the regime recognition algorithm. Preferably different controllable suspension system algorithm gains are utilized depending upon the type of terrain or location of vehicle CG, vehicle operating parameters, operator accelerating/braking, internal and external inputs and comparisons with stored data.

In an embodiment preferably the at least first controllable force suspension member is comprised of a semi-active damper, preferably with a control signal to the damper varies the damper force produced by damper. In preferred embodiments the semi-active damper is a magnetorheological fluid damper. In preferred embodiments the semi-active damper is controllable valve damper. In preferred embodiments the semi-active damper is a servo valve controlled damper. In preferred embodiments the semi-active damper is a controllable variable orifice damper. In preferred embodiments the semi-active damper is a controllable variable fluid flow damper.

In an embodiment preferably the at least a first controllable force suspension member is comprised of an actuator, preferably with a control signal to the actuator produces an active suspension contraction or extension.

In an embodiment preferably the at least a first controllable force suspension member is comprised of a controllable spring. Preferably the controllable spring is comprised of an adjustable air spring member. In preferred embodiments the controllable spring is combined with a semi-active damper, preferably a magnetorheological fluid damper. Preferably the controllable spring adjustable air spring member is controlled to adjust the vehicle height.

Preferably the suspension sensors 25 suspension sensor measurement outputs include a plurality of displacements between the body 39 and the land engagers 43.

Preferably the body motion sensor 31 vehicle body motion measurement outputs include a plurality of rate sensor outputs, such as degree/sec, angular rate.

Preferably the body motion sensor 31 vehicle body motion measurement outputs include a plurality of accelerometer outputs, such as m/sec$^2$, linear acceleration. Preferably the body motion sensor 31 vehicle body motion measurement outputs include a plurality of six degrees of freedom of body motion outputs.

Preferably the computer system 23 stores a plurality of condition data for a plurality of vehicle suspension components 35 in the computer readable accessible data storage medium.

Preferably the computer system 23 provides a perceptible output when a vehicle suspension component is in need of corrective action such as in need of repair or replacement of a component because of a detected failure or a detected impending failure mode.

Preferably the controllable suspension system algorithm is modified in response to the monitored health usage of a sensed vehicle suspension component. The controllable suspension system algorithm is preferably modified control the suspension force and/or ride height and to provide optimal limp-home mode, and to preferably limit force through suspension controllable force members, such as a failing damper, in response to identified suspension component failure/impending failure modes.

Preferably the vehicle computer system 23 outputs a plurality of suspension output data to an external computer, the external computer external to the vehicle, preferably a central depot computer, preferably logistics maintenance computer.

Preferably the suspension control algorithm adapts/adjusts gains and controls the suspension based on the type of terrain, such as paved road, unpaved dirt road, off-highway, no road at all, and uses current sensed terrain engaged land data and also compared with past terrain stored and/or shared data for the geographic location. Preferably with adjustable height suspension, preferably with controllable springs and adjustable height air springs, the height is lowered for on road travel, and the height is raised for off road travel, especially for terrain with large obstacles, such as rocks and logs. Preferably the monitoring system anticipates and identifies failures before and after failures, and then adjust the suspension for limp home, preferably limiting suspension force through damaged/failing/failed suspension components 35/systems. Preferably with the land engagers 43 primary controllable suspension system sensor outputs and the body sensor motion outputs the computer system 23 analyzes suspension system displacement at the land engagers 43 to both monitor and collect data on the land/terrain that is being engaged and on the condition and health of the suspension system between the land engager and the body 39. Preferably the system provides for monitoring of vehicle gross weight and CG, and additionally for backup monitoring of fuel usage, ammunition usage, and other consumable usage during a trip. Preferably the system reduces loading coming through the suspension system. Preferably the system provides for terrain mapping and regime recognition, and collects vehicle data, preferably suspension sensor and body motion data combined with geographic location data, such as from GPS, to provide road/terrain condition map from land engagers 43 engagement of the land collecting data on the land engaged. Preferably the system provides improved suspension control and vehicle mobility with regime recognition.

In an embodiment the invention includes a land vehicle 37 system for a land vehicle 37 having a body 39, a power plant 41 and a plurality of land engagers 43 the land engagers 43 for engaging land and propelling the land vehicle 37 across land. Preferably the system is for military land vehicles 37. Preferably the system is for utility vehicles, preferably non-car vehicles, preferably non-light duty utility vehicles with plurality of driven on/off-road engagers, preferably more than two driven wheels. Preferably the land vehicle 37 system includes a controllable suspension system, the controllable suspension system for controlling a plurality of suspension movements between the body 39 and the land engagers 43, and a computer system 23 with computer readable medium.

The computer system 23 preferably comprises a central computer with a central processor, preferably for controlling a plurality of controllable force suspension members 29. In alternative embodiments the computer system 23 preferably comprises a distributed computer system 23 with subunits proximate suspension sites/controllable force suspension members 29 located proximal the land engagers 43, with the distributed processing subunits linked together to communicate data. Preferably the land vehicle 37 controllable suspension system includes a plurality of suspension sensors 25 located proximal to, all or some of, the land engagers 43 suspension locations 27 for measuring a plurality of suspension parameters representative of suspension movements between the body 39 and the land engagers 43 and outputting a plurality of suspension sensor measurement outputs; a plurality of controllable force suspension members 29 located proximal the land engagers 43 and the suspension sensors 25, the controllable force suspension members 29 for applying a plurality of controllable suspension travel forces between the body 39 and the land engagers 43 to control the suspension movements; and body motion sensor 31, the body motion sensor 31 for outputting a plurality of vehicle body motion measurement outputs. Preferably the land vehicle 37 controllable suspension system includes a vehicle databus 33 interfacing with the computer system 23, the vehicle databus 33 communicating a plurality of vehicle data communication signals. Preferably the computer system 23 receives the suspension sensor measurement outputs and the vehicle body motion measurement outputs and executes a controllable suspension system algorithm for controlling the controllable force suspension members 29 to control vehicle body motion and the suspension movements between the body 39 and the land engagers 43, and the computer system 23 executing a health usage monitoring algorithm for monitoring the outputs and assessing a health usage of a vehicle component, preferably a plurality of vehicle components in the suspension and connected with the suspension. Preferably the system includes a vehicle databus 33 interface interfacing with the computer system 23, the vehicle databus 33 interface communicating a plurality of vehicle data communication signals to the computer system 23. Preferably the computer system 23 executes a regime recognition algorithm for using the outputs and inputted vehicle data communication signals from a vehicle databus 33 output to determine a vehicle operating parameter, such as a terrain type or a vehicle operating configuration such as the current loaded gross vehicle weight. Preferably the computer system 23 executes a regime recognition algorithm for using the outputs and the vehicle data communication signals from the databus 33 to determine a vehicle operating configuration and the controllable suspension system algorithm is modified in response to the regime recognition algorithm. Preferably the computer system 23 executes a regime recognition algorithm for using the outputs to determine at least a vehicle operating parameter and a vehicle operating configuration and wherein the controllable suspension system algorithm is modified in response to the regime recognition algorithm, such as different suspension algorithm gains are utilized depending upon type of terrain or location of vehicle CG, vehicle operating parameters, operator gas/braking, internal and external environmental inputs and comparisons with stored data.

Preferably the at least a first controllable force suspension member is comprised of a semi-active damper, with a control signal to the damper varying the damper force produced by damper, preferably a MR damper.

Preferably the at least a first controllable force suspension member is comprised of an active suspension actuator.

Preferably the at least a first controllable force suspension member is comprised of a controllable spring, preferably adjustable air spring member.

Preferably the suspension sensors 25 suspension sensor measurement outputs include a plurality of displacements between the body 39 and the land engagers 43.

Preferably the body motion sensor 31 vehicle body motion measurement outputs include a plurality of rate sensor outputs (degree/sec, angular rate).

Preferably the body motion sensor 31 vehicle body motion measurement outputs include a plurality of accelerometer outputs (m/sec2, linear acceleration). Preferably the body motion sensor 31 vehicle body motion measurement outputs include a plurality of six degrees of freedom of body motion outputs. Preferably the computer system 23 stores a plurality of condition data for a plurality of vehicle suspension components 35 in the medium. Preferably the computer system 23 provides a perceptible output when a vehicle suspension component is in need of corrective action. Preferably the controllable suspension system algorithm is modified in response to a health/usage of a sensed vehicle suspension component. Preferably the computer system 23 outputs a plurality of suspension output data to an external computer, preferably a central depot computer, preferably a logistics maintenance computer.

In an embodiment the invention includes a monitoring apparatus for diagnosing faults in the land vehicle 37 having a body 39, a power plant 41 and a plurality of land engagers 43, the land engagers 43 for engaging land and propelling the land vehicle 37 across land.

The apparatus including the controllable suspension system, the controllable suspension system for controlling a plurality of suspension movements between the body 39 and the land engagers 43. The monitoring apparatus includes the plurality of suspension sensors 25 located proximal to the land engagers 43 suspension locations 27 for measuring a plurality of suspension parameters representative of suspension movements between the body 39 and the land engagers 43 and outputting a plurality of suspension sensor measurement outputs. The monitoring apparatus includes the plurality of controllable force suspension members 29 located proximal the land engagers 43 and the suspension sensors 25, the controllable force suspension members 29 for applying a plurality of controllable suspension travel forces between the body 39 and the land engagers 43 to control the suspension movements. The monitoring apparatus includes the body motion sensor 31, the body motion sensor 31 for outputting a plurality of vehicle body motion measurement outputs. The monitoring apparatus receives the suspension sensor measurement outputs and the vehicle body motion measurement outputs and executes controllable suspension system instructions for controlling the controllable force suspension members 29 to control vehicle body motion and the suspension movements between the body 39 and the land engagers 43, and the apparatus including computer system 23 reference data store containing failure mode identification data and associated system data sampled from behavior of the controllable suspension system in the failure mode; and a similarity engine responsive to monitored system data indicative of monitored behavior of the controllable suspension system, for generating at least one similarity value for a comparison of the monitored data to the failure mode associated system data, as a diagnostic indication of the failure mode. The monitoring apparatus preferably includes the computer system 23, with a central computer and/or distributed computer system 23 with subunits proximate suspension sites/controllable force suspension members 29 located proximal the land engagers 43, linked together to communicate data. The monitoring apparatus preferably includes the vehicle databus 33 interfacing with the computer system 23, the vehicle databus 33 communicating a plurality of vehicle data communication signals. Preferably the system data is residual data. Preferably the monitoring apparatus further includes a model for generating estimates of operational data in response to receiving operational data from the system; and a signal generator for differencing the estimates and the received operational data to generate the residual data. Preferably the model for generating estimates is a non-parametric model. Preferably the monitoring apparatus further includes a failure identification module responsive to similarity values from the similarity engine for determining an indicated failure mode. Preferably the failure identification module compares similarity values for a plurality of failure modes in the data store, and identifies at least the failure mode with the highest similarity as an indicated failure mode of the system. Preferably the failure identification module compares similarity values for a plurality of failure modes in the data store, and identifies at least the failure mode with the highest average similarity as an indicated failure mode of the system. Preferably the failure identification module compares similarity values for a plurality of failure modes in the data store, and identifies as an indicated failure mode of the system at least the failure mode with at least a selected number of highest similarities over a window of successive comparisons.

In an embodiment the invention includes a method for diagnosing faults in a land vehicle 37 having a body 39, a power plant 41 and a plurality of land engagers 43, the land engagers 43 for engaging land and propelling the land vehicle 37 across land, the method including: providing a controllable suspension system, the controllable suspension system disposed between the body 39 and the land engagers 43 to control a plurality of suspension movements between the body 39 and the land engagers 43, the controllable suspension system including a plurality of suspension sensors 25 located proximal to all or some of the land engagers 43 suspension locations 27 for measuring a plurality of suspension parameters representative of suspension movements between the body 39 and the land engagers 43 and outputting a plurality of suspension sensor measurement outputs; a plurality of controllable force suspension members 29 located proximal the land engagers 43 and the suspension sensors 25, the controllable force suspension members 29 for applying a plurality of controllable suspension travel forces between the body 39 and the land engagers 43 to control the suspension movements; a body motion sensor 31, the body motion sensor 31 for outputting a plurality of vehicle body motion measurement outputs; with the controllable suspension system receiving the suspension sensor measurement outputs and the vehicle body motion measurement outputs and executing controllable suspension system instructions for controlling the controllable force suspension members 29 to control vehicle body motion and the suspension movements between the body 39 and the land engagers 43, and the controllable suspension system acquiring monitored controllable suspension system data indicative of monitored controllable suspension behavior of the controllable suspension system; sampling controllable suspension system data from a controllable suspension failure mode to define controllable suspension reference system data associated with the controllable suspension failure mode, and comparing for similarity the monitored system data to the reference system data to generate a similarity value as a diagnostic indication of the controllable suspension failure mode. Preferably the controllable suspension system data is residual controllable suspension data. Preferably the method further comprises generating estimates of operational data in response to acquiring operational controllable suspension data from the controllable suspension system; and differencing the estimates and the received operational data to generate the residual controllable suspension data. Preferably the method further comprises the step of determining an indicated controllable suspension failure mode based on similarity values resulting from the similarity comparisons. Preferably the determining step comprises comparing the similarity values for a plurality of controllable suspension failure modes, and identifying at least the controllable suspension failure mode with the highest similarity as an indicated controllable suspension failure mode of the system. Preferably the determining step comprises comparing the similarity values for a plurality of failure modes, and identifying at least the failure mode with the highest average similarity as an indicated failure mode of the system.

In an embodiment, the invention provides diagnostic capabilities in a monitoring system for land vehicles 27 and controllable suspension system. Preferably a collection of diagnostic conditions is provided as part of the operation of the computer controlled controllable suspension system on-line monitoring of the vehicle suspension system and vehicle components from physical components and subsystems instrumented with sensors. Outputs created by the on-line monitoring are preferably compared to the diagnostic conditions collection, and if a signature of one or more diagnostic conditions is recognized in such outputs, the system provides a diagnosis of a possible impending suspension system failure mode. Preferably the diagnostics utilize a nonparametric empirical model that generates estimates of sensor values in response to receiving actual sensor values from the controllable suspension system sensors. The estimated sensor values generated by the model are preferably subtracted from the actual sensor values to provide residual signals for the sensors. During normal vehicle use with the controllable suspension and related components functioning properly as modeled by the empirical model the residual signals are essentially zero with some noise from the underlying physical parameters and the sensor noise. Such residuals become move from zero when the controllable suspension and related vehicle components begin to fail. Preferably a sensitive statistical test such as the sequential probability ratio test is applied to the residuals to provide the earliest possible decision whether the residuals are moving off zero, often at such an early stage that the residual trend away from zero is still buried in the noise level. Preferably when a decision is made that the residual is non-zero, an alert is generated for that sensor for the relevant time period. Alternatively an alert may be generated to enforce thresholds on the residual itself for each parameter, alerting on that parameter when the thresholds are exceeded. The collected recorded diagnostic conditions can be referenced using the residual data itself, or alternatively using the sequential probability ratio test alert information or the residual threshold alert information. Failure modes are preferably stored in the computer system 23 computer readable medium recordable diagnostic conditions collection. When the pattern of sequential probability ratio test alerts or residual threshold alerts matches the stored signature the failure mode is recognized, and the diagnosis made. Alternatively, when the residual data pattern is similar to a residual data pattern in the stored collection using a similarity engine, the corresponding failure mode is recognized and the diagnosis made. Preferably when the failure mode is recognized the controllable suspension system adjusts the control of the suspension system in response to such diagnosis, preferably when force through a diagnosed component is to be limited until appropriate repair is made to correct such failure mode, in addition to providing explanatory descriptions, suggested investigative steps, and suggested repair steps either to a vehicle operator or communicated to an external depot maintenance computer.

In an embodiment, the invention includes a monitoring apparatus for diagnosing faults in a land vehicle 37 having a body 39, a power plant 41 and a plurality of land engagers 43, the land engagers 43 for engaging land and propelling the land vehicle 37 across land. The apparatus including a controllable suspension system, the controllable suspension system for controlling a plurality of suspension movements between the body 39 and the land engagers 43, a plurality of suspension sensors 25 located proximal to all or some of the land engagers 43 suspension locations 27 for sensing a plurality of suspension measurables and outputting a plurality of suspension sensor measurement outputs; a plurality of controllable force suspension members 29 located proximal the land engagers 43 and the suspension sensors 25, the controllable force suspension members 29 for applying a plurality of controllable suspension travel forces between the body 39 and the land engagers 43 to control the suspension movements; a body motion sensor 31, the body motion sensor 31 for outputting a plurality of vehicle body motion measurement outputs; the apparatus receives the suspension sensor measurement outputs and the vehicle body motion measurement outputs and executes controllable suspension system instructions for controlling the controllable force suspension members 29 to control vehicle body motion and the suspension movements between the body 39 and the land engagers 43, and the apparatus including computer readable failure mode reference identification data for detecting a failure mode in the controllable suspension system; and the apparatus compares monitored controllable suspension system data to the failure mode reference identification data to a diagnose an impending failure mode of the controllable suspension system. The apparatus including the computer system 23 with the central computer and/or the distributed computer system 23 with subunits proximate suspension sites/controllable force suspension members 29 located proximal the land engagers 43, and linked together to communicate data. The apparatus preferably includes the vehicle databus 33 interfacing with the computer system 23, the vehicle databus 33 communicating a plurality of vehicle data communication signals. Preferably the apparatus includes a global geographic positioning input, wherein the apparatus collects the suspension sensor measurement outputs and the vehicle body motion measurement outputs with the geographic positioning inputs to provide a computer readable media stored geographic data map indicating land terrain suspension land engagement conditions for geographic positions engaged by the land engagers 43. Preferably the apparatus at a later time, when returning to an already engaged land geographic position, the apparatus modifies the control of the controllable suspension system in response to the computer readable media stored geographic data map, preferably using a stored map to know when to adjust and change the suspension system from past history saved in map data. Preferably the apparatus outputs the computer readable media stored geographic data map indicating land terrain suspension land engagement conditions for geographic positions engaged by the land engagers 43 to an external computer. Preferably the apparatus receives a shared computer readable media stored geographic data map indicating land terrain suspension land engagement conditions for geographic positions engaged by the land engagers 43 of another vehicle from an external computer.

In an embodiment, the invention includes a monitoring method for diagnosing faults in a plurality of land vehicles 37. The method includes providing a plurality of land vehicles 37 comprised a body 39, a power plant 41 and a plurality of land engagers 43, the land engagers 43 for engaging land and propelling the land vehicles 37 across land, the land vehicles 37 including a controllable suspension system, the controllable suspension system for controlling a plurality of suspension movements between the body 39 and the land engagers 43, the controllable suspension system including a plurality of suspension sensors 25 located proximal to all or some of the land engagers 43 suspension locations 27 for sensing a plurality of suspension measurables and outputting a plurality of suspension sensor measurement outputs; the controllable suspension system including a plurality of controllable force suspension members 29 located proximal the land engagers 43 and the suspension sensors 25, the controllable force suspension members 29 for applying a plurality of controllable suspension travel forces between the body 39 and the land engagers 43 to control the suspension movements; the controllable suspension system including a body motion sensor 31, the body motion sensor 31 for outputting a plurality of vehicle body motion measurement outputs. The method includes receiving the suspension sensor measurement outputs and the vehicle body motion measurement outputs and executing controllable suspension system instructions for controlling the controllable force suspension members 29 to control vehicle body motion and the suspension movements between the vehicle bodies and the land engagers 43. The method includes providing computer readable failure mode reference identification data for detecting a failure mode in the controllable suspension systems and comparing monitored controllable suspension system data to the failure mode reference identification data to a diagnose an impending failure mode of the controllable suspension systems. Preferably the method includes providing the vehicles with a global geographic positioning input device for providing each vehicle with its geographic positioning input while engaging land (GPS, global position satellite, inertia guidance tracking positioning) and collecting the suspension sensor measurement outputs and the vehicle body motion measurement outputs with the geographic positioning inputs to provide a computer readable media stored geographic data map indicating land terrain suspension land engagement conditions for geographic positions engaged by the land engagers 43. Preferably the method includes outputting the computer readable media stored geographic data map indicating land terrain suspension land engagement conditions for geographic positions engaged by the land engagers 43 to an external computer. Preferably the method includes sharing the computer readable media stored geographic data map indicating land terrain suspension land engagement conditions for geographic positions engaged by the land engagers 43 with a plurality of the vehicles. Preferably the method includes adjusting the controllable suspension system in response to the computer readable media stored geographic data map indicating land terrain suspension land engagement conditions for geographic positions engaged by the land engagers 43 when returning to the geographic position. Preferably the method includes adjusting the controllable suspension system in response to the shared computer readable media stored geographic data map indicating land terrain suspension land engagement conditions for geographic positions engaged by the land engagers 43 when engaging land at the collected geographic position. Preferably the method includes outputting to an external computer at least one controllable suspension system data output chosen from the controllable suspension system data output group of the suspension sensor measurement outputs, the vehicle body motion measurement outputs, the compared monitored controllable suspension system data, the failure mode reference identification data, and the diagnose of an impending failure mode. Preferably the method includes sharing the controllable suspension system data output with a plurality of the vehicles.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. A land vehicle, said land vehicle having a body, a power plant and a plurality of land engagers, said land engagers for engaging land and propelling said land vehicle across land, said land vehicle including
    a controllable suspension system, said controllable suspension system for controlling a plurality of suspension movements between said body and said land engagers,
    a computer system with computer readable medium;
    a plurality of suspension sensors located proximal to said land engagers for measuring a plurality of suspension parameters representative of suspension movements between said body and said land engagers and outputting a plurality of suspension sensor measurement outputs;
    a plurality of controllable force suspension members located proximal said land engagers and said suspension sensors, said controllable force suspension members for applying a plurality of controllable suspension travel forces between said body and said land engagers to control said suspension movements;
    a body motion sensor, said body motion sensor for outputting a plurality of vehicle body motion measurement outputs;
    a vehicle databus interfacing with said computer system, said vehicle databus communicating a plurality of vehicle data communication signals;
    wherein said computer system receives said suspension sensor measurement outputs and said vehicle body motion measurement outputs and said computer readable medium including a first program instruction with said computer system executing a controllable suspension system algorithm for controlling said controllable force suspension members to control vehicle body motion and said suspension movements between said body and said land engagers, and said computer readable medium including a second program instruction with said computer system executing a health usage monitoring algorithm for monitoring said outputs and assessing a health and a usage of a vehicle component.

2. A vehicle as claimed in claim 1, wherein said computer system computer readable medium includes a third program instruction with said computer system executing a regime recognition algorithm for using said outputs and said vehicle data communication signals from said databus to determine a vehicle operating parameter.

3. A vehicle as claimed in claim 1, wherein said computer system computer readable medium includes a third program instruction with said computer system executing a regime recognition algorithm for using said outputs and said vehicle data communication signals from said databus to determine a vehicle operating configuration.

4. A vehicle as claimed in claim 2 wherein said controllable suspension system algorithm is modified in response to said regime recognition algorithm.

5. A vehicle as claimed in claim 1, wherein said computer system computer readable medium includes a third program instruction with said computer system executing a regime recognition algorithm for using said outputs and said vehicle data communication signals from said databus to determine at least a vehicle operating parameter and a vehicle operating configuration and wherein said controllable suspension system algorithm is modified in response to said regime recognition algorithm.

6. A vehicle as claimed in claim 1 wherein at least a first controllable force suspension member is comprised of a semi-active damper.

7. A vehicle as claimed in claim 1 wherein at least a first controllable force suspension member is comprised of an actuator.

8. A vehicle as claimed in claim 1 wherein at least a first controllable force suspension member is comprised of a controllable spring.

9. A vehicle as claimed in claim 1 wherein said suspension sensors suspension sensor measurement outputs include a plurality of displacements between said body and said land engagers.

10. A land vehicle system, for a land vehicle having a body, a power plant and a plurality of land engagers, said land engagers for engaging land and propelling said land vehicle across land, said land vehicle system including
   a controllable suspension system, said controllable suspension system for controlling a plurality of suspension movements between said body and said land engagers,
   a computer system with computer readable medium;
   a plurality of suspension sensors located proximal to said land engagers for measuring a plurality of suspension parameters representative of suspension movements between said body and said land engagers and outputting a plurality of suspension sensor measurement outputs;
   a plurality of controllable force suspension members located proximal said land engagers and said suspension sensors, said controllable force suspension members for applying a plurality of controllable suspension travel forces between said body and said land engagers to control said suspension movements;
   a body motion sensor, said body motion sensor for outputting a plurality of vehicle body motion measurement outputs;
   wherein said computer system receives said suspension sensor measurement outputs and said vehicle body motion measurement outputs and executes a controllable suspension system algorithm for controlling said controllable force suspension members to control vehicle body motion and said suspension movements between said body and said land engagers, and said computer system executing a health usage monitoring algorithm for monitoring said outputs and assessing a health usage of a vehicle suspension component.

11. A system as claimed in claim 10 including a vehicle databus interface interfacing with said computer system, said vehicle databus interface communicating a plurality of vehicle data communication signals to said computer system.

12. A system as claimed in claim 11, wherein said computer system executes a regime recognition algorithm for using said outputs and inputted vehicle data communication signals from a vehicle databus output to determine a vehicle operating parameter.

13. A system as claimed in claim 11, wherein said computer system executes a regime recognition algorithm for using said outputs and said vehicle data communication signals from said databus to determine a vehicle operating configuration.

14. A system as claimed in claim 12 wherein said controllable suspension system algorithm is modified in response to said regime recognition algorithm.

15. A system as claimed in claim 10 wherein at least a first controllable force suspension member is comprised of a semi-active damper.

16. A system as claimed in claim 10 wherein said computer system stores a plurality of condition data for a plurality of vehicle components in said medium.

17. A system as claimed in claim 10 wherein said computer system provides a perceptible output when a vehicle component is in need of corrective action.

18. A system as claimed in 10, wherein said controllable suspension system algorithm is modified in response to a health/usage of a sensed vehicle component.

* * * * *